United States Patent
Gupta et al.

(10) Patent No.: US 12,380,892 B2
(45) Date of Patent: *Aug. 5, 2025

(54) LIMITING IDENTITY SPACE FOR VOICE BIOMETRIC AUTHENTICATION

(71) Applicant: Pindrop Security, Inc., Atlanta, GA (US)

(72) Inventors: Payas Gupta, Atlanta, GA (US); Elie Khoury, Atlanta, GA (US); Terry Nelms, II, Atlanta, GA (US); Vijay Balasubramaniyan, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 303 days.

This patent is subject to a terminal disclaimer.

(21) Appl. No.: 17/832,146

(22) Filed: Jun. 3, 2022

(65) Prior Publication Data

US 2022/0392452 A1    Dec. 8, 2022

Related U.S. Application Data

(60) Provisional application No. 63/197,059, filed on Jun. 4, 2021.

(51) Int. Cl.
*G10L 17/04*    (2013.01)
*G06F 21/32*    (2013.01)
*G10L 17/22*    (2013.01)

(52) U.S. Cl.
CPC .............. *G10L 17/04* (2013.01); *G06F 21/32* (2013.01); *G10L 17/22* (2013.01)

(58) Field of Classification Search
USPC .......................... 704/246, 247, 251, 252, 275
See application file for complete search history.

(56) References Cited

U.S. PATENT DOCUMENTS 10,922,631 B1 *  2/2021  Shahidzadeh ......... H04W 4/029
11,641,368 B1 *  5/2023  Shah ................... H04L 63/1433
                                                   726/6

(Continued)

OTHER PUBLICATIONS

International Search Report and Written Opinion on PCT Appl. Ser. No. PCT/US22/32065 dated Oct. 11, 2022 (16 pages).

(Continued)

*Primary Examiner* — Leonard Saint-Cyr
(74) *Attorney, Agent, or Firm* — Foley & Lardner LLP

(57) ABSTRACT

Disclosed are systems and methods including computing-processes executing machine-learning architectures extract vectors representing disparate types of data and output predicted identities of users accessing computing services, without express identity assertions, and across multiple computing services, analyzing data from multiple modalities, for various user devices, and agnostic to architectures hosting the disparate computing service. The system invokes the identification operations of the machine-learning architecture, which extracts biometric embeddings from biometric data and context embeddings representing all or most of the types of metadata features analyzed by the system. The context embeddings help identify a subset of potentially matching identities of possible users, which limits the number of biometric-prints the system compares against an inbound biometric embedding for authentication. The types of extracted features originate from multiple modalities, including metadata from data communications, audio signals, and images. In this way, the embodiments apply a multi-modality machine-learning architecture.

20 Claims, 5 Drawing Sheets

(56) References Cited

U.S. PATENT DOCUMENTS

| | | | |
|---|---|---|---|
| 2013/0227678 A1 | 8/2013 | Kang et al. | |
| 2013/0239191 A1 | 9/2013 | Bostick | |
| 2015/0262496 A1 | 9/2015 | Cook et al. | |
| 2016/0006730 A1 | 1/2016 | Chari et al. | |
| 2018/0130475 A1* | 5/2018 | Page | G10L 25/84 |
| 2019/0333522 A1* | 10/2019 | Lesso | G10L 17/06 |
| 2021/0152549 A1* | 5/2021 | Wu | G06N 3/04 |
| 2021/0250342 A1* | 8/2021 | Budman | G06N 7/01 |
| 2021/0327011 A1* | 10/2021 | Bielby | G06V 40/172 |
| 2021/0344659 A1* | 11/2021 | Bloom | G06Q 20/3276 |
| 2022/0030345 A1* | 1/2022 | Gong | G06F 21/84 |
| 2022/0116392 A1* | 4/2022 | Shah | H04L 63/0876 |
| 2022/0272084 A1 | 8/2022 | Hyatt | |
| 2022/0366916 A1 | 11/2022 | Dos Santos et al. | |

OTHER PUBLICATIONS

Foreign Action other than Search Report on PCT Dtd Dec. 14, 2023.
Gaika et al., "Voice authentication embedded solution for secured access control," in IEEE Transactions on Consumer Electronics, vol. 60, No. 4, pp. 653-661, Nov. 2014. (Year: 2014).

\* cited by examiner

LIMITING IDENTITY SPACE FOR VOICE BIOMETRIC AUTHENTICATION

CROSS-REFERENCE TO RELATED APPLICATIONS

This application claims priority to U.S. Provisional Application No. 63/197,059, filed Jun. 4, 2021, which is incorporated by reference in its entirety.

This application generally relates to U.S. application Ser. No. 16/992,789, entitled "Caller Verification via Carrier Metadata, filed Aug. 13, 2020, which is incorporated by reference in its entirety.

This application generally relates to U.S. application Ser. No. 17/231,672, entitled "Passive and Continuous Multi-Speaker Voice Biometrics," filed Apr. 15, 2021, which is incorporated by reference in its entirety.

This application generally relates to U.S. application Ser. No. 17/491,292, entitled "Enrollment and Authentication over a Phone Call in Call Centers," filed Sep. 30, 2021, which is incorporated by reference in its entirety.

This application generally relates to U.S. application Ser. No. 17/155,851, entitled "Robust Spoofing Detection System Using Deep Residual Neural Networks," filed Jan. 22, 2021, which is incorporated by reference in its entirety.

This application generally relates to U.S. application Ser. No. 16/841,473, entitled "System And Methods For End-To-End Architectures For Voice Spoofing Detection," filed Apr. 6, 2020, which is incorporated by reference in its entirety.

TECHNICAL FIELD

This application generally relates to systems and methods for managing, training, and deploying a machine learning architecture for audio processing.

BACKGROUND

Today's popular voice interaction systems and online computing services use speaker recognition to identify the users with biometrics, such as using aspects of a user's voice to identify the user as an expected speaker for personalization, as well as improving automatic speech recognition (ASR) and authorization features. Unfortunately, services relying on voice recognition across vendors may require users to register or enroll the user biometrics with each vendor system separately. This configuration may be sufficient when used for one or two vendors, but as voice interfaces become commonplace in things like household appliances, TVs, cars, electronic gadgets, Internet of Things (IoT) devices, or door locks, among many others, the volume of different vendors relying on voice biometrics—each having to enroll the user separately—will result in a very poor user experience and risks low user adoption rates of an otherwise useful technology. What is desired is a means for seamless speaker recognition and voice biometrics-based identification across vendors, where the functionality is generally agnostic to the particularities of the vendors' systems.

Another limitation of prior voice biometrics comes from an approach to design that such systems only deploy (are used) privately. Some devices are limited to recognizing only a single member of a household. Because of the private-use paradigm, such devices or services offer limited expansion for new users. For instance, when visiting a neighbor's house and using the neighbor's voice assistant device, the device will not identify the user, even if the user owns and is registered with an identical voice assistant device at home. This limitation hinders fully utilizing voice interactions with devices in more public settings, such as an offices (voice assistant in a conference room providing sales numbers during a meeting), hotel rooms (Netflix personalization using voice), or coffee shops (paying automatically when ordering using voice). What is desired is a seamless means for voice biometrics identification across devices or computing services.

SUMMARY

Disclosed herein are systems and methods capable of addressing the above-described shortcomings and may also provide any number of additional or alternative benefits and advantages. Embodiments include a computing device that executes software routines for one or more machine-learning architectures. The embodiments described herein include the machine-learning architecture executed by an authentication system. The system invokes the identification or authentication operations of the machine-learning architecture when a user is accessing devices or services whether the user or product is situated in private or public spaces. Moreover, the operations of the system enable the user to access devices or services without enrolling separately across disparate back-end identification systems. In this way, the system allows the user to enroll once with the system (or any identity provider) and the system may authenticate the user for any number of registered devices without separately enrolling with the devices or services.

In an embodiment, a computer-implemented method may comprise generating, by a computer, one or more enrolled biometric-prints for an enrollee-user in an enrollee-record of a database, by applying one or more biometric recognition engines of a machine-learning architecture on enrollment biometric data for the enrollee-user; receiving, by the computer, a first authentication request from a first provider server to authenticate a first inbound user, and a second authentication request from a second provider server to authenticate a second inbound user; generating, by the computer, a first inbound biometric-print and a second inbound biometric-print corresponding to the first inbound user and the second inbound user, by applying the one or more biometric engines on the corresponding first inbound contact data and the second inbound contact data; and transmitting, by the computer, a first result for the first computing service to the first provider server based upon a similarity between the first inbound biometric-print and the enrolled biometric-print in the user data record, and a second result for the first second computing service to the second provider based upon the similarity between second inbound biometric-print and the enrolled biometric-print.

In another embodiment, a computer may comprise a processor configured to a database comprising a non-transitory machine-readable storage configured to store a plurality of enrollee-records for a plurality of enrollee-users; and a computer comprising a processor and in communication with the database, the computer configured to: generate one or more enrolled biometric-prints for an enrollee-user in an enrollee-record of the database, by applying one or more biometric recognition engines of a machine-learning architecture on enrollment biometric data for the enrollee-user; receive a first authentication request from a first provider server to authenticate a first inbound user, and a second authentication request from a second provider server to authenticate a second inbound user; generate a first inbound biometric-print and a second inbound biometric-print corresponding to the first inbound user and the second inbound user, by applying the one or more biometric engines on the corresponding first inbound contact data and the second inbound contact data; and transmit a first result for the first computing service to the first provider server based upon a similarity between the first inbound biometric-print and the enrolled biometric-print in the user data record, and a second result for the first second computing service to the second provider based upon the similarity between second inbound biometric-print and the enrolled biometric-print.

In another embodiment, a computer-implemented method may comprise generating, by the computer, for an enrollee-user, one or more enrollee biometric-prints by applying one or more corresponding biometric recognition engines of a machine-learning architecture on enrollment biometric data, and one or more enrollee context-prints by applying one or more metadata recognition engines of the machine-learning architecture on the enrollment metadata; storing, by the computer, into an enrollee-record in a database, the one or more enrollee biometric-prints and the one or more enrollee context-prints; extracting, by the computer, an inbound context-print by applying the one or more metadata recognition engines on inbound metadata associated with an inbound user, and an inbound biometric-print by applying the one or more biometric recognition engines on inbound biometric data associated with the inbound user; selecting, by the computer, a set of enrollee-records containing at least one enrollee context-print satisfying a threshold amount of distance from the inbound context embedding; and identifying, by the computer, the enrolled biometric-print from the set of enrolled-user records satisfying a threshold distance of similarity with the inbound biometric-print.

In another embodiment, a system may comprise a database comprising non-transitory machine-readable storage configured to store a plurality of enrollee-records for a plurality of enrollee-users; and a computer in communication with the database and comprising a processor configured to generate for an enrollee-user, one or more enrollee biometric-prints by applying one or more corresponding biometric recognition engines of a machine-learning architecture on enrollment biometric data, and one or more enrollee context-prints by applying one or more metadata recognition engines of the machine-learning architecture on the enrollment metadata; store into an enrollee-record in the database, the one or more enrollee biometric-prints and the one or more enrollee context-prints; extract an inbound context-print by applying the one or more metadata recognition engines on inbound metadata associated with an inbound user, and an inbound biometric-print by applying the one or more biometric recognition engines on inbound biometric data associated with the inbound user; select a set of enrollee-records containing at least one enrollee context-print satisfying a threshold amount of distance from the inbound context embedding; and identify the enrolled biometric-print from the set of enrolled-user records satisfying a threshold distance of similarity with the inbound biometric-print.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
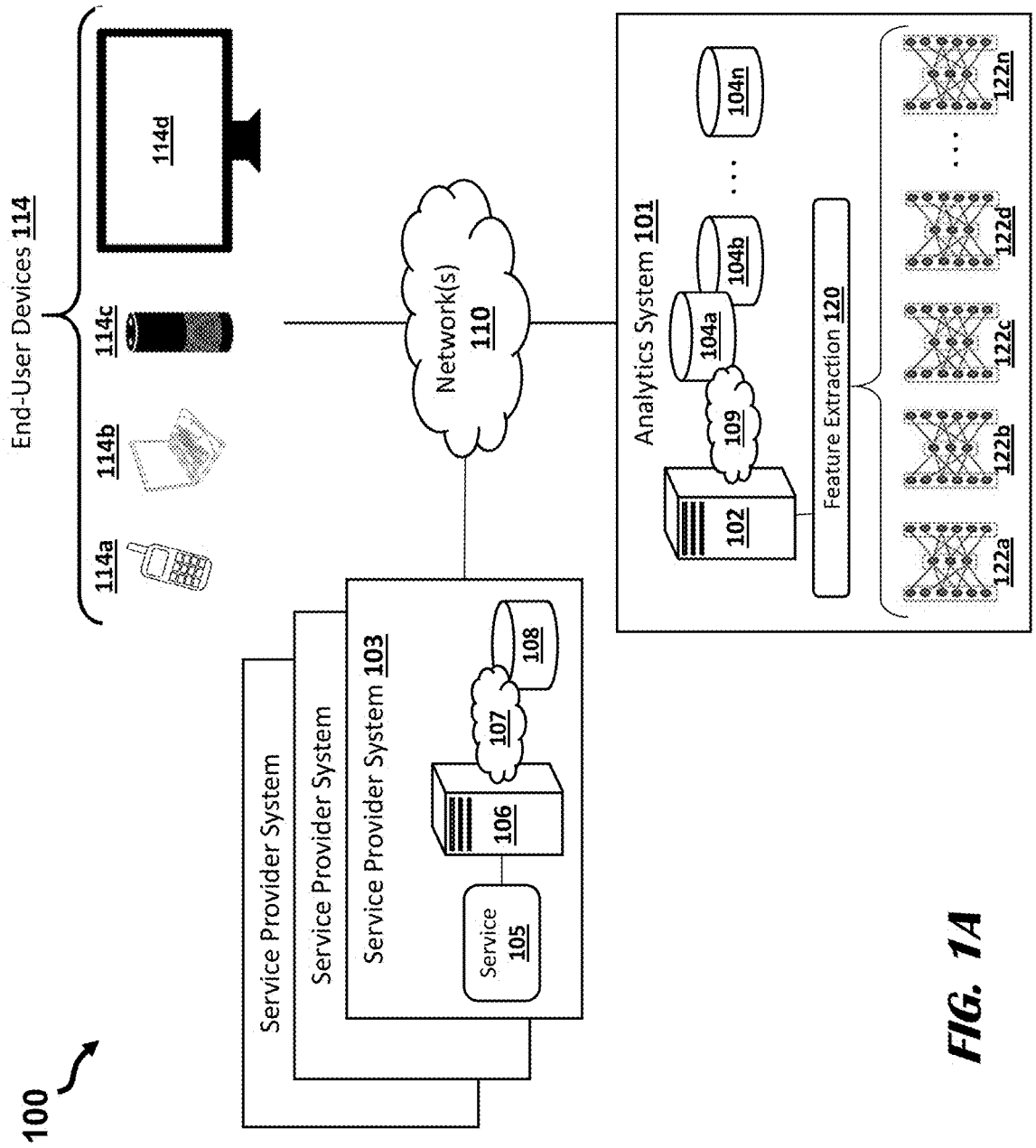
FIG. 1A shows components of a system for processing authentication requests on behalf of a variety of computing services accessed by end-users, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for processing various types of contact data associated with contact events (e.g., phone calls, VoIP calls, remote access, webpage access) for authentication and risk management. The contact data may include audio signals for speakers, software or protocol data, and inputs received from the end-user, among others. The processes described herein manage the types of data accessible to and employed by various machine-learning architectures that extract various types of contact data from contact events and output predicted identities of end-users, authentication determinations, or risk threat determinations. The features extracted by the machine-learning architecture originate from multiple modalities, including metadata from data communications, as well as audio signal data and image data captured by a microphone and optical device (e.g., camera) associated with the user device. In this way, the embodiments apply a multi-modality machine-learning architecture.

Speaker recognition (voice biometrics) utilizes unique characteristics of a person's voice to identify or authenticate the person as a user of a device or service. These unique characteristics may be evaluated to generate feature vectors combined from multiple samples of the user, to produce an embedding vector (sometimes called a "voiceprint"). The voice biometrics for speaker recognition and other operations (e.g., authentication) typically relying upon the models or the feature vectors ("embeddings" or "voiceprints") generated from the set of speaker samples and samples of the particular speaker.

As an example, during a training phase (or re-training phase), a server or other computing device executes a speech recognition engine (e.g., artificial intelligence and/or machine-learning programmatic software) that is trained to recognize and distinguish instances of speech using a plurality of training audio signals. The machine-learning architecture outputs certain results according to corresponding inputs and evaluates the results according to a loss function by comparing the expected output against the observed output. The training operations then tailor the weighted values or hyper-parameters of a neural network in the machine-learning architecture, and then re-apply the machine-learning architecture to the input training data until the expected outputs and observed outputs converge within a threshold level or error. The server then adjusts or tunes the hyper-parameters and, in some cases, disables one or more layers of the neural network architecture used for training.

After training the machine-learning architecture, the server can further refine and develop the machine-learning architecture to recognize a particular speaker during enrollment operations for the particular speaker. The speech recognition engine can generate the enrollee voiceprint using the speaker feature vectors or embeddings extracted from the enrollee audio signals containing the utterances of the speaker. Later, during deployment, the server receives one or more inbound audio signals and refers to the voiceprints stored in a speaker profile in order to confirm whether later inbound audio signals involve the known speaker based upon matching an inbound embedding extracted from the later inbound audio signal against the enrollee's voiceprint.

These approaches are generally successful and adequate for detecting the enrollee in the context of assessing inbound phone calls to a call center. More flexible and less-visible approaches to the enrollment and deployment operations might be desirable in other contexts, when users would prefer a more fluid or less-structured experience, such as instances when users are watching television or operating certain IoT or voice-enabled devices (e.g., vehicles, smart appliances, personal assistances).

Through the enrollment process, a voice biometrics system associates the enrollee-user's voiceprint with one or more identities, such as the user's name or credentials for computing services. For voice interactions (sometimes called "transactions") attempting to perform a function or access a feature that does not require stringent security (e.g., personalizing a computing service interface or content), the enrollment or registration might occur passively, in the background while user interacts with the services or devices. The voice interactions that require more security (e.g., money transactions) typically expect the user actively participated in the enrollment process, because the voiceprint is linked to a real-life identity (rather than, for example, an arbitrary email address). During this active enrollment process, the user is asked to prove their identity via some other means such as knowledge-based authentication (KBA), government-issued identification(s), ownership of an email address, or authentication through an account in another system, among others. Once the user successfully enrolls, passively or actively, the system can identify or authenticate for future voice interactions by matching the stored enrolled voiceprint associated with the user's identity or identities.

Speaker recognition techniques are not always perfect. Errors generally fall into two categories: false acceptance and false rejection. False acceptance is incorrectly identifying or authenticating a user as someone else. False rejection is improperly failing to identify or authenticate an approved, registered user of the system. The performance of a speaker recognition system is measured as the percentage of voice interactions in which the error occurs and is known as the false acceptance rate (FAR) and false rejection rate (FRR), respectively. The risks or costs a committing an error are not always equal. For instance, the risks of an error in proper authentication when conducting a wire transfer is comparably higher compared to the risks of an error in authenticating a user attempting to personal streaming content. Service owners usually optimize the balance of performance against accuracy by trading one for the other (e.g., decreasing FAR at the cost of increasing FRR). This balance is difficult for identification and authentication with biometrics systems, as identification is a common use case but more resource intensive.

Authentication and identification are not the same. Authentication is the process of verifying that a user is who the user purports to be. Thus, the first step of authentication is an identity claim. A common identity claim includes, for example, a username (e.g., j smith). Once the identity claim is made, the user is request to prove it. Passwords are an example of a common technique used to establish identity. In the case of speaker recognition, the user's voice making the identity claim is compared to the voiceprint enrolled for the identity. If there is a match, the user is successfully authenticated.

Identification is a form of authentication, conducted without an explicit identity claim. The system determines and verifies (i.e., authenticates) a user's identity without the user asserting a particular identity claim. Since there is no identity claim, the user's voice is compared against most or all of the system's enrolled voiceprints. If one of the inbound voiceprint matches, then the system successfully identified the user as the enrolled user associated with the matching enrolled voiceprint.

Identification is harder and more resource intensive than authentication, because identification requires system processors to compare any number of enrolled voiceprints against the inbound voiceprint to match the inbound user's voice against some unknown enrolled user's voice. In the end, the inbound user's voice might not match any of the enrolled users' voices, in which case the system processors would have evaluated all or nearly all of the enrolled voiceprints. The issue is the additional compute resources for identification compared to authentication. For authentication, only one comparison is needed. If it takes 1 ms compare and match an inbound voiceprint against a stored voiceprint, then the total compute time is 1 ms. For identification, the resource requirements and timing scale with the number of enrollment voiceprints that the processor need to query and compare. So a system with 100 enrollments may take system 100 ms. Although this may be an oversimplification of the problem, increased enrollments nevertheless results in near-linear scaling. As the system scales to tens-of-thousands of enrollment voiceprints, the latency, throughput, and costs of the system performance become complex, impracticable, or ineffective.

Moreover, identification processes generate comparatively more false-accepts versus authentication processes, even though the underlying speaker recognition processes' false-accept rate (FAR) is the same. This disparity comes from the identification processes performing a much larger volume of comparisons, thereby increasing the opportunity of error. Each additional enrolled voiceprint that the system compares against the inbound voiceprint increases the likelihood of falsely matching the user. For instance, if the FAR of a speaker recognition system is 1% and there are 100 users enrolled, then for authentication there is a 1% chance an unenrolled user will falsely authenticate; however, for identification, the chance is greater than 60% ($1.0 - 0.99^{100}$).

Embodiments described herein seek to mitigate the resource demands of identification processes, even though an express identity claim is unavailable. The embodiments include a machine-learning architecture that extracts various types of features and feature vectors representing metadata associated with users and user devices, thereby developing a context-awareness and metadata-awareness of enrolled users and inbound users that the machine-learning architecture use as an intermediate, less-than-perfect comparison. By comparing these various types of metadata embeddings or fused context embeddings, the machine-learning architecture identifies or infers a set of candidate potential identities. The machine-learning architecture then compares the inbound voiceprint against the enrolled voiceprints associated with the set of potential identities, rather than possibly all or most of the enrolled voiceprints. This approach mitigates the potential for errors and the resource demands.

As mentioned, voice-based devices and services are based on design theories envisioning private operations, limiting the functionality, expandability, and adaptability of the voice-based products. Another limitation on voice-based products is that each service's voice-recognition systems rely upon disparate enrollments, resulting in limited adoption. Embodiments described herein include a central database of enrollment features and embeddings offering a single point of enrollment for end-users. Moreover, a central analytics service offers user identification or authentication services to any number of computing services or devices, where the machine-learning architecture is agnostic to the disparate service provider systems. This centralized analytics service and enrollment databases allows the user to authenticate across disparate voice-based products.

Identifying/authenticating users during their normal voice interactions provides personalization and security without being intrusive. There is no need to prompt for an identity claim or ask the user to speak a password/pin. This results in seamless conversations that are focused on fulfilling the customer's request instead of interrogating them. However, there are many challenges in designing and developing a speaker recognition system that can work across devices/vendors/third parties, confidently identify users in private and public settings, and use context to properly balance FAR/FRR. For example, speaker recognition in a public setting is much more challenging than in a private setting. For one thing, there is more noise in a public environment and that makes speaker recognition more difficult. Another challenge is the number of users that may interact with the system. The higher the number of interfering speakers, the more likely the system incorrectly identifies the user (especially if the user is not enrolled), even if the FAR is very low. In the public setting, a speaker recognition system may use other, often weak, identification methods to limit the enrollments that are compared. The context embedding described herein is a workable compromise, limiting the enrollment query space while still ultimately applying stronger voice biometrics to ultimately confirm the user's identity. This will keep the FAR at an acceptable level and minimize the workload on the system. The embodiments may also use the centralized data to determine the transaction context to facilitate the agnostic identification and authentication benefits of the analytics system.

For instance, voice interaction systems (e.g., voice assistant devices) allow for third-party services integration. For example, a user may operate an Amazon Alexa® to access a bank account by installing a "skill" integration. Unfortunately, even if the local voice assistant device recognizes the user, the user would still need to authenticate with the bank (e.g., speak a secret PIN). Passing the identity to the third party is difficult for a few reasons. There is no shared identity between the voice assistant and the third party, so even if the voice assistant is confident in the user's identity, there is no way to match that to the third-party's enrollment voiceprint. In addition, the voice assistant device does not have the necessary context of the third-party's service to determine the level of confidence required for speaker identification in view of the requested transaction function. For instance, a third-party bank is likely to require a high-level of confidence to transfer $1,000 compared to the confidence require to personal media streaming preferences. The money transfer likely requires much more confidence (lower FAR) in the user's identity. The embodiments described herein determine and reference the transaction context to determine the minimum level of confidence in the identity to properly balance FAR and FRR.

The embodiments described herein include the machine-learning architecture executed by an authentication system. The system invokes the identification or authentication operations of the machine-learning architecture when a user is accessing devices or services whether the user or product is situated in private or public spaces. Moreover, the operations of the system enable the user to access devices or services without enrolling separately across disparate back-end identification systems. In this way, the system allows the user to enroll once with the system (or any identity provider) and the system may authenticate the user for any number of registered devices without separately enrolling with the devices or services.

Example System Components

FIG. 1A shows components of a system 100 for processing authentication requests on behalf of a variety of computing services accessed by end-users. The system 100 comprises enterprise-computing infrastructures 101, 103, including an analytics system 101 and one or more service provider systems 103. The system 100 further includes any number of end-user devices 114a-114c (collectively referred to as an end-user device 114 or end-user devices 114). The system 100 includes one or more external networks 110s through which the devices of the enterprise computing infrastructures 101, 103 and the end-user devices 114 communicate. The component computing devices of the analytics system 101 may communicate via one or more internal networks 105; and likewise the computing devices of the service provider system 103 may communicate via one or more internal networks 107. The system 100 implements one or more machine-learning architectures having layers or functions defining one or more functional engines 122a-122d (collectively referred to as a functional engine 122 or functional engines 122) for identifying, recognizing, or authenticating end-users based upon multi-model, multi-device, and/or frictionless authentication operations for interactions between the end-user devices 114 and computing services 105 or other functions of the system 100, such functions performed by user devices 114 or hosted on the various provider servers 106.

Embodiments may comprise additional or alternative components or omit certain components from those of FIG. 1A and still fall within the scope of this disclosure. It may be common, for example, to include multiple identification servers 102. Embodiments may include or otherwise implement any number of devices capable of performing the various features and tasks described herein. For example, FIG. 1A shows the identification server 102 as a distinct computing device from the analytics database 104. In some embodiments, the analytics database 104 includes an integrated identification server 102.

In operation, an end-user attempts to access a feature or function (i.e., type of transaction) of an end-user device 114 or computing service offered by the service provider system 103, thereby initiating a transaction request for the type of transaction to the service provider system 103. A provider server 106 of the service provider system 103 receives and processes the transaction request and inbound contact data contained in the transaction request. The service provider system 103 forwards an authentication request containing the inbound contact data and, in some cases, additional information or instructions, to the analytics system 101. The identification server 102 receives and processes the inbound contact data originated from the end-user device 114 to predict an identity, previously enrolled and registered with the identification server 102, best matching the user's actual identity, even if the end-user never asserted an identity claim or the analytics system 101 did not receive an identity claim assertion. The identification server 102 executes various operations of one or more machine-learning architectures that, for example, recognize a speaker's voice in audio data or face in visual data. In some embodiments, the identification server 102 detects whether the biometric data contains a deepfake of the speaker's voice or facial image. The identification server 102 outputs a score or indication of whether the purported identity of the end-user or other contact data received from the end-user device 114 indicates a likely match to a known identity within the similarity threshold. The identification server 102 may report the identity determinations or other outputs (e.g., risk score, identification match results) to the service provider system 103. The provider server 106 or computing service may perform additional authentication or authorization operations to determine whether to approve or reject the transaction request.

The system 100 includes one or more external networks 110 comprising various hardware and software components of one or more public or private networks, interconnecting the various components of the system 100. Non-limiting examples of such networks 110 may include Local Area Network (LAN), Wireless Local Area Network (WLAN), Metropolitan Area Network (MAN), Wide Area Network (WAN), and the Internet. The communication over the networks 110 may be performed in accordance with various communication protocols, such as Transmission Control Protocol and Internet Protocol (TCP/IP), User Datagram Protocol (UDP), and IEEE communication protocols. Likewise, the end-user devices 114 use the networks 110 for communicating with the customer-facing service provider systems 103 or the analytics system 101 via telephony and telecommunications protocols, hardware, and software capable of hosting, transporting, and exchanging audiovisual data (e.g., computer files, data stream). Non-limiting examples of telecommunications and/or computing networking hardware may include switches and trunks, among other additional or alternative hardware used for hosting, routing, or managing data communication, circuits, and signaling via the Internet or other device communications medium. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Various different entities manage or organize the components of the telecommunications systems, such as carriers, networks, and exchanges, among others.

The system 100 includes various enterprise computing infrastructures including the analytics system 101 and one or more service provider systems 103. The analytics system 101 and service provider systems 103 represent computing network infrastructures, where each comprises physically and logically related software and electronic devices managed or operated by an enterprise organization hosting various types of services to the end-users or to other enterprise infrastructures.

The analytics system 101 includes hardware and software components performing analytics services and operations that support security postures on behalf of the service provider systems 103, by processing and analyzing data received from end-users. Non-limiting examples of the analytics services include user identification, cross-provider identity management, speaker recognition (e.g., speaker diarization), user authentication, and data analytics about the end-users, among others. The analytics service operates the analytics system 101 comprising various hardware, software, and networking components configured to host and provide the analytics services to the service provider systems 103. The devices of the analytics system 101 execute various software programming for hosting and performing the intended analytics services and communicate via one or more internal networks 105. The analytics system 101 receives various types of information from the service provider systems 103 via the networks 110 and returns various outputs according to the embodiments and implementations described herein. The analytics system 101 includes any number of identification servers 102 and analytics databases 104, interconnected via the internal network(s) 105, for performing the various features and functions described here.

The service provider systems 103 includes hardware and software components that host user facing, commercial (B2B), or internal-enterprise computing services accessible to the end-user devices 114. Non-limiting examples include cloud-computing services, media content services (e.g., Netflix®, TiVO®), and enterprise call centers (e.g., interactive voice response (IVR) service, chatbot services), among others. The service provider system 103 includes any number of provider servers 106 and provider databases 108, interconnected via the internal network(s) 107, for performing the various features and functions described here. The provider servers 106, for example, perform various registration and enrollment functions for registering the end-users and end-user devices 114 with the service provider system 103. The provider server 106 captures and stores various types of data about the end-users and end-user devices 114 into the provider database 108, and forward (via the network 110) some or all of the user and/or device information to the analytics system 101.

In operation, the provider server 106 (of the service provider system 103) receives various types of input data from the end-user devices 114 and forwards the input data to the identification server 102 (of the analytics system 101). The identification server 102 executes various analytics processes described herein using the input data forwarded from the provider server 106, and then transmits various outputs to the provider server 106 resulting from the analytics processes. The provider server 106 employs the outputs received from the identification server 102 to perform the various computing services accessed by the end-user devices 114.

In some circumstances, the service provider system 103 or the analytics system 101 might ordinarily identify a user based on, for example, user credentials (e.g., username, password), challenge questions (e.g., favorite color, mother's maiden name, childhood address), or metadata of the end-user device 114 (e.g., IP address, ANI), but the analytics system 101 described herein additionally or alternatively identifies the end-user (on behalf of the service provider system 103) based on the user inputs, spoken utterances or other biometrics, transaction context (what the end-user is attempting to accomplish), and more sophisticated approaches to the metadata (e.g., deviceprints enrolled for known, registered devices), among others.

The end-user devices 114 include any type of electronic device allowing users to access and interact with services of the service provider systems 103. The end-user device 114 includes a processor and non-transitory machine-readable memory containing instructions executable by the processor. The end-user device 114 comprises or couples to devices for receiving user inputs and capturing user biometric information, such as a microphone, a camera or similar optical device (e.g., retinal scanner), keyboard, mouse, thumbprint scanner, and the like. The end-user device 114 further comprises or couples to hardware and software components for communicating via the network 110. Non-limiting examples of the end-user device 114 include a smartphone 114a or similar mobile telecommunications device, laptop 114b or other personal computing (PC) device, tablet device, voice assistant device 114c, media streaming device 114d (or smart television), autonomous vehicle, and smart appliance, among others.

In some embodiments, the end-user device 114 executes a locally installed mobile software application or accesses a remote cloud-based software application for performing various identity-management operations (sometimes referred to as an "identity application" or "identity app") associated with the provider system 103 or the analytics system 101. For instance, the end-user downloads and installs the identity app on the end-user device 114 to access the identity services of the service provider system 103 and analytics system 101, such as enrolling an end-user identity and user account with a new service provider system 103 or new end-user device 114. Alternatively, the user accesses a webpage/website using a browser for enrolling the user identity and user account with a new service provider system 103 or new end-user device 114. In some instances, the end-user carries a trusted physical device that can be used for enrolling the user's voice and identity with the new service provider system 103 or new end-user device 114, where the trusted device may include a trusted end-user device 114 or encryption key seed generation token associated with the analytics system 101 or service provider system 103.

The identity app facilitates capture of the types of data used by the service provider system 103 and analytics system 101 for authenticating or otherwise identifying the end-user for a given transaction initiated by the end-user operating the end-user device 114. In some cases, the identity app allows the end-user to enter configuration inputs to establish preferences and configurations associated with aspects of the user account. At an initial registration with the service provider system 103 or the analytics system 101, the identity app presents the end-user various visual and/or audio instructions or prompts indicating the types of enrollment data the end-user should supply to the analytics system 101.

In some embodiments, the user device 114 may comprise or couple to a microphone for capturing audio waves containing the user's utterances and generating electronic audio signals converted from analog audio signals including the audio waves, which the user device 114 processes and transmits as digital audio data representing the electronic audio signals. Additionally or alternatively, in some embodiments the user device 114 may comprise or couple to an optical device (e.g., camera) for capturing optical imagery information (e.g., still images, video, visual spectrum, infrared), which the user device 114 processes and transmits as digital image data representing the captured optical imagery.

The user device 114 may further comprise or couple to an audio speaker for audio playback of digital audio data received by the user device 114, which may generate and present an audio-based user interface, and a visual monitor for displaying a graphical user interface.

As an example, the identity app instructs the end-user to speak a number of enrollment utterances that the microphone of the end-user device 114 captures in enrollment audio signals. The captured sound includes the background noise (e.g., ambient noises) and/or utterances of one or more speaker-users. Additionally or alternatively, the user inputs can include videos (or images) of users (e.g., facial expressions, gestures) captured by or uploaded to the end-user device 114. The user inputs to the user interface can include interface inputs into a physical or graphical user interface, such as a touch input swiping across the end-user device 114, using the end-user device 114 in a gesture, pressing buttons on the end-user device 114 (e.g., keypad dual-tone multi-frequency (DTMF) tones), inputting text, capturing biometric information such as a fingerprint, and the like.

The user device 114 transmits various categories and types of data to the server 102, 106, including user inputs, user biometric data (or multimedia data ingested by the identification server 102 for downstream biometric operations), and metadata, among various other data. The identity app or service provider system 103 may send various types of metadata or information about the end-user and end-user device 114, which the identification server 102 may receive, extract, and store as various types of metadata features in the analytics databases 104. As explained further below, the identification server 102 may apply one or more functional engines 122, including metadata recognition or metadata processing engines of the machine-learning architecture, such as a context engine 122d and risk engine 122a. In some cases, the identification server 102 may capture metadata or derive various metadata features associated with the user and the end-user device 114, based on the information received from end-user device 114 or provider server 106. The identity app captures the metadata of the user device 114 by, for example, querying the local operating system or other hardware or software components of the user device 414. Non-limiting examples of the metadata transmitted by the end-user device 114 (or otherwise obtained by the identification server 102) includes, location data, device identifiers, and device-interaction logs, among others.

The location metadata includes various types of data that indicates current or historic locations of the end-user or the end-user device 114. The location metadata may include express location information (e.g., GPS coordinates) or relative location information such as proximity indicators, such as logs of observed SSIDs of WiFi access points, which indicate physical proximity of the end-user device 114 to those access points. Using the location or proximity indicator data from the identity app, the identification server 102 may identify or otherwise locate other user devices (not shown) having the identity app and situated proximate (e.g., 10 ft, 500 ft, 1 mi, 10 mi) to the user device 114. The identity app may instruct the user device 114 to transmit data in the background to the identification server 102, databases 104, or provider server 106, continuously as a data stream, at preconfigured intervals (e.g., 30 sec, 2 min, 1 hr), at preconfigured execution events (e.g., initial launch of the identity app), in response to a request received from a server 102, 106, or according to any combination thereof. For instance, the user device 114 may transmit certain types of data when the user device 114 launches and executes the identity app and then every five minutes transmits the data (or updates to the data); but also the user device 114 may continuously stream other types of data to the server 102, 106.

The metadata may include various types of device identifiers. The device identifiers may include, for example, the IP address of the user device 114 or the public IP address presented to webservers browsed to by the device 114; the physical hardware MAC Address of the user device 114; a 15-digit unique International Mobile Equipment Identity (IMEI) identifying the SIM card of the device 114; the International Mobile Subscriber Identity (IMSI) code used by a phone company to identify the SIM on a mobile network; and the Bluetooth Address (also referred to as a "Bluetooth MAC address" or "BD ADDR") that uniquely identifies the Bluetooth interface of the user device 114; among others. In some cases, the identity app transmits network observations or interactions logged in the user device 114, such as a listing of SSIDs of WiFi Access Points (e.g., WiFi routers) received by the user device 114, or a listing of Bluetooth identifiers indicating the Bluetooth devices/addresses visible to, or observed by, the user device 114.

The identity app may include various security and privacy configuration options, configurable by the user or by an administrative user of an enterprise architecture (e.g., user's corporate enterprise, service provider system 103, analytics system 101). The security configurations impose certain limitations or thresholds risks instructing the identity app to prompt the user for a two-factor (or multi-factor) authentication operation. For example, the identity application's security configurations require two-factor authentication when the user device 114 attempts or requests a transaction having a given transaction risk level, or to register a new user, associate a new provider server 106 with the user's account, or register a new end-user device 114, among other transaction-types. The user may configure the security options to require two-factor authentication in all circumstances; when the transaction risk level satisfies a threshold; or according to one or more classifications determined by one or more functional engines 122 of the machine-learning architecture trained to output a transaction risk score or classification, and/or a contact risk score or classification. For instance, the machine-learning architecture may output a transaction risk level value (e.g., monetary value associated with the transaction requested by the end-user) or classify the transaction risk level (e.g., "low," "medium," "high"; numeric scale '1-5'), or the like.

In some embodiments, the identity app may determine the transaction risk level based upon various rules-based algorithms. For example, the identity app determines the transaction level based upon threshold amounts of money involved or categories of transactions as indicated by the user inputs (e.g., checking bank account balance; adding new device to the analytics database 104; accessing subscription information of a media content stream service). Additionally or alternatively, the identity app or the identification server 102 executes layers of the machine-learning architecture that determine the transaction risk level, which may include, for example, the risk engine 122a or context engine 122d or another functional engine 122 defined by layers of the machine-learning architecture. For instance, in a rules-based engine, the user may enter an input indicating the current location of the end-user device 114 includes either a trusted space (home) or an untrusted space (coffeehouse) or an amount of money being transferred between banking accounts. In an example machine-learning approach, the end-user device 114 or other device of the system 100 executes a context engine 122d that determines the transaction context (i.e., the functions and features of the service provider system 103 the user is trying to access; what that end-user is attempting to accomplish). The context engine 122d of the end-user device 114 extracts certain types of features from the metadata and generates a context embedding. A trained classifier of the end-user device 114 determines the transaction context and the level of transaction risk based upon, for example, background noise, whereby the machine-learning architecture is trained to predict whether the current location of the user device 114 includes either a trusted space or an untrusted space.

As mentioned, the identity app of the end-user device 114 may include various privacy configuration options in addition, or as an alternative to, the security configuration options. In some implementations, the privacy options include limitations on the geo-location data transmitted by the user device 114 to the computing services 105, the provider servers 106, and the identification server 102. The user enters configuration inputs that instruct the identity app to limit or cease ("turn off") the geo-location data transmission to the servers 102, 106. For example, the user enters a configuration input instructing the identity app to turn-off sending GPS coordinates entirely. As another example, the configuration input instructs the identity app to limit sending the GPS coordinates to only when the identity app determines that the GPS coordinates of the user device 114 indicate a proximate (within a threshold distance) to, or at a same location as, another device that the user or the user device 114 previously interacted with (e.g., according to logs or listings of SSIDs, IP addresses, or Bluetooth identifiers). As another example, the configuration input instructs the identity app to limit sending the GPS coordinates to only when the identity app determines that the GPS coordinates of the user device 114 indicate a proximate (within a threshold distance) to, or at a same location as, another device that the user or the user device 114 may interact with (e.g., receive new SSID, new IP address, or new Bluetooth address of the other device).

Service Provider Systems and Computing Services

The provider servers 106 of the service provider systems 103 host software programming for various types of computing services 105 accessible to the end-user devices 114 and the identity app. The computing service 105 receives inputs from the end-user devices 114 and invokes identification operations, or other operations, of the identification server 102 based on the transaction request instructions received from the end-user devices 114. In an example operation, when the user attempts to access the user device 414 or the computing service 105, the identity app transmits instructions and contact-related data to the provider server 106 and instructions to invoke the computing service 105. In some cases, the computing service 105, in turn, performs certain local operations for authenticating and authorizing the user, or authentication and authorization operations that ingest authentication results returned from the analytics system 101. The computing service 105 transmits an authentication request to the identification server 102, using an API of the identification server 102, invoking the identification operations of the identification server 102. The inbound contact data from the user device 114 includes various types of data associated with the user and/or the user device 114, such as a voice command (including one or more voice samples with utterances of the user) and metadata of the user or the user device 114. In operation, the computing service 105 receives the inbound contact data from the end-user device 114 and, using the API, transmits the authentication request to the identification server 102 containing the inbound contact data. The authentication request instructs the identification server 102 to identify (determine) and retrieve (return) an identity of the end-user associated with the one or more voice samples of the inbound contact data.

In some embodiments, the computing service 105 executes operations for registering and authenticating the end-user or end-user device 114. The computing service 105 registers the end-user device 114 by capturing or generating various types of device-identifying information associated with the end-user device 114, and storing the metadata into user data records of the analytics databases 104 or provider databases 108. The computing service 105 further registers the user or user device 114 according to user-identity information, indicating one or more registered users permitted to access the end-user device 114, whereby the end-user device 114 is registered with the computing service 105 such that the end-user device 114 may be accessed by the one or more pre-identified registered users using the voice biometrics of those users in the future. Accordingly, in some embodiments, the computing service 105 executes operations for access control over the end-user device 114, limiting permitted user access to the end-user device 114. The access control may be implemented by the computing service 105 or other aspect of the provider server 106, which may prompt the user for certain credentials or impose other types of access controls over devices based upon access configuration rules and user accounts stored in the provider databases 108 or analytics databases 104. Moreover, the access control operations of the provider server 106 may improve efficiency and performance of the analytics system 101.

In operation, the access control operation of the computing service 105 determines access rights for a given identity. Embodiments of the identification server 102 need not receive an identity claim to identify the end-user. However, in some cases, the access control operation receives or determines a set of purported identities associated with the transaction request, such as a purported identity asserted by the end-user, or one or more related identities associated with the purported identity according to a record of the provider database 108. When invoking the identification operations, the computing service 105 forwards the set of purported identities to the computing service 105 using the API for requesting the identification services of the analytics system 101. During downstream operations performed by the identification server 102 when identifying predicted identities, the set of purported identities prepared by the computing service 105 effectively limits the search space queried by the identification server 102 from a broader universe of possible identities in the analytics databases 104, which the identification server 102 would otherwise query and evaluate. For example, the analytics database 104 or provider database 108 include database records indicate that a particular household laptop 114a, television 114d, or office copier machine (not shown) is registered with the service provider system 103 or analytics system 101 and that the particular laptop smartphone 114a, television 114d, or office copier is associated with a preapproved set of authorized users or identities. The computing service 105 may fetch certain database record information for the end-user device 114 indicating the set of authorized users having preapproved access to the end-user device 114. The computing service 105 may forward this set of authorized users to the identification server 102, facilitating more efficient queries of the analytics databases 104 (e.g., voiceprint database 104c) by the identification server 102.

In some implementations, the computing service 105 executes operations for authorization controls over users. The authorization controls include preconfigured permissions rules controlling the activities or access levels granted to the users of the system 100. The authorization controls manage authorization rules based upon, for example, the identity of the user predicted by the identification server 102 or asserted by the end-user. In some embodiments, the authorization rules may be based upon the risk score or transaction type as generated by the context classification returned a context engine 122d, executed by the identification server 102 or the computing service 105.

The computing service 105 receives certain types of metadata or information about the end-user, prior to or during the transaction, which the computing service 105 forwards to the identification server 102. Additionally or alternatively, the computing service 105 receive the various types metadata with the inbound contact data, or in some embodiments, derives (generates) certain information about the user from the inbound contact data, as received from the user attempting the transaction (e.g., accessing the user device 114, moving funds in banking account, accessing content of a streaming service). The computing service 105 may perform various internal operations of the provider servers 106 of the service provider system 103 using this contact data (e.g., user inputs, received metadata, derived meta-information) and/or forward this contact data to the identification server 102. Non-limiting examples of the metadata received from the user device 114 includes the geo-location data of the user device 114; the listing of WiFi access point SSIDs observed by the user device 114; and the listing of Bluetooth identifiers observed by the user device 114, among others.

The computing service 105 may further receive user attribute data including information about the user, such as personal identifiable information (PII). Non-limiting examples of user attributes in the user attribute data includes name, phone number, home address, and/or email address. In some cases, the computing service 105 receives user attribute data in the contact data during a transaction from the user via the end-user device 114 or other device. In some cases, the computing service 105 receives some or all user attribute data from a third-party database or from another device prior to or during the ongoing transaction. As an example, the computing service 105 acquires a phone number of the user by querying a carrier database (not shown) using the "Caller ID," signaling metadata, or other carrier information. This example may be useful in circumstances involving voice transactions between the user and the provider server 106 (or computing service 105) over the phone smartphone 114a, when the end-user device 114 is the user's mobile phone smartphone 114a calling into a call center of the service provider system 103. The service provider system 103 collects the purported user attribute data for initial access control and authorization controls, and the identification system may perform further voice-based identification and authentication of the user, because the purported user attribute data (e.g., phone number) might not uniquely identify the user (e.g., a business number) or might be spoofed.

The computing service 105 may receive or determine the list users authorized to use the end-user device 114. The source of the user access rules that provision access rights include configuration inputs directly from the user of the system 100 or dynamically from another software application. As an example, a third-party scheduling or calendar program may circulate a meeting invitation for a given conference room containing the user device 114 (e.g., conference room phone, teleconference software system). The provider server 106 includes external-facing APIs for ingesting and parsing the conference room location and resource information (e.g., indicator of the user device 114) and any user identity information of the calendar invitation format (e.g., .ical, .ics) and automatically provisions access rights for the user identity or user device 114 to the particular user identities listed in the meeting invitation.

The contact data, as received or generated by the computing service 105, further includes information about a particular transaction that the user is attempting to perform when accessing the user device 114, such as transaction context data and transaction risk data. The transaction context includes various types of data representing descriptive information about the transaction, such as a category or type of transaction and various other details related to the transaction (e.g., user, identity). For example, the transaction could be simply include the user's attempt to attain access to the user device 114 or software program. The transaction context information includes a types or category associated with this particular login attempt transaction. As another example, the transaction includes a banking transaction, such as an effort to access a banking account or transfer funds from the banking account. The transaction information further includes the transaction risk data, indicating one or more values (e.g., monetary amount subject to the transaction) or representative feature vector representing the severity or seriousness of the transaction's risk level.

In some embodiments, the provider server 106, identification server 102, or identity app receives or determines the transaction risk, and references the transaction risk for one or more downstream operations, such as determining a risk score for the transaction or determining a risk threshold for the transaction. Additional details of the risk engine 122a and context engine 122d are described below for the identification server 102, though embodiments of the computing service 105 may perform some or all of the functions performed by the risk engine 122a or context engine 122d.

The contact data further includes a device identifier for the user device 114, uniquely identifying the user device 114 within the system 100. In some cases, during a registration enrollment process for the user or for the user device 114, the provider server 106 captures and stores one or more existing identifiers (e.g., MAC address, IP address, Bluetooth identifier) of the user device 114 as the new device ID. Additionally or alternatively, the user device 114 or provider server 106 dynamically generate the device ID based upon one or more algorithms and any number of inputs, such as the exiting identifiers or random values.

The inbound or enrollment contact data further includes the multimedia data captured by the microphone or camera of the user device 114, such as audio data and image data. The audio data includes an audio recording data file or data stream, and/or audio biometric speaker features, of the user interacting with the user device 114. The image data includes an image data file or data stream, and/or image biometric features, of the user interacting with the user device 114.

Analytics System

The analytics system 101 includes one or more identification servers 102. The identification server 102 may be any computing device comprising one or more processors and software, and capable of performing the various processes and tasks described herein. The identification server 102 may host or be in communication with analytics databases 104 (e.g., identity database, voiceprint database, account database, context database), and may receive various types of data from the end-user device 114 or provider server 106 via the networks 110, such as audio signals or other media data, user inputs, and speaker-independent characteristics (e.g., metadata, signaling data), among other types of data. Although FIG. 1 shows a single identification server 102, the identification server 102 may include any number of computing devices. In some configurations, the identification server 102 may comprise any number of computing devices operating in a cloud computing or virtual machine configuration. In some embodiments, computing devices of the service provider system 103 (e.g., provider server 106) partly or entirely perform functions of the identification server 102.

The software programming executed by the identification server 102 includes functions and operations of layers of one or more machine-learning architectures, where the layers define various types of operations or engines. The example system 100 includes a single machine-learning architecture comprising the various layers and functional engines 122 described here, and FIGS. 1A-1B display five components of layers defining feature extraction functions 120 and various functional engines 122 of the machine-learning architecture, including the risk engine 122a, identification engine 122b, voice biometric engine 122c, and context engine 122d. Other embodiments may include layers defining additional or alternative functional engines 122 than those of the example system 100. Moreover, embodiments may include any number of functional engines 122 or layers, forming any number of distinct or integrated machine-learning architectures. The identification server 102 may enable or disable various functions, layers, or functional engines 122 of the machine-learning architecture according to the particular operational phase (e.g., training, enrollment, deployment/testing) or when performing only a particular sub-component's function.

The identification server 102 executes various software-based processes that ingest various types of enrollment data or inbound contact data, such as audio signal (e.g., audio recording of speaker utterances, user identities or identifiers, metadata) from the end-user device 114 or the service provider system 103. The identification server 102 may update or query the one or more analytics databases 104, and applies various machine-learning operations on the inputted enrollment data or inbound data. The machine-learning algorithms implement any number of techniques or algorithms (e.g., Gaussian Matrix Models (GMMs), neural networks) for performing the various operations described herein, such as detecting audio events, extracting embeddings, generating or updating enrolled voiceprints, and identifying/authenticating one or more users having utterances in the audio signal, among others.

In operation, the feature extraction 120 includes any number of computing devices comprising hardware (e.g., processors, non-transitory machine-readable memory) and software components and capable of performing the various processes and operations described here. The software programming of the identification server 102 includes software routines for identifying and authenticating the end-user using speaker biometric features of the user's voice, the metadata of the user device 114, and/or metadata user attributes received or derived for the user. Using the data receive received from the provider server 106 or user device 414, the identification server 102 predicts a best possible or most likely identity match from stored database records of an identity database identity database 104a or other analytics databases 104 containing enroller user data.

The identification server 102 returns the identification result to the provider server provider server 106, which generates a user interface prompt to the user at the user device 114, indicating the identification result. The identification server 102 and/or the user device 114 may perform certain operations based upon the identification result. For example, the identification server 102, provider server 106, or user device 114 rejects or permits access to the user device 114 or software, or halts or executes operations, for processing the transaction, and user device 114 permits or disallows to the user to perform the transaction.

As another example, the end-user device 114 prompts the user for additional information proving the user's identity or authentication. The user device 114 (or other device of the system 100) permits the user to access the user device 114 or perform the transaction in response to the user providing the additional identity information. For instance, the voice biometrics or user credentials may be satisfactory for the provider server 106 and identification server 102 respectively.

In some embodiments, the service 105 or identification server 102 may transmit a push notification to the user device 114, prompting the user enter a confirmation input at the user device 114. In this way, the identification server 102 or provider server 106 implements multi-factor authentication operations for evaluating the user's identity claim with further confidence. In some implementations, the push notification includes a one-time password (OTP) generated by the provider server 106 or identification server 102. The user receives the one-time password (OTP) as the push notification to the user device 114 or via any number of communication channels (e.g., email, phone call, SMS message). The user speaks or enters inputs indicating the OTP into the user device 114 or other device (not shown), which the identity app or the locally authenticates or forwards to the provider server 106 for authentication. Additionally or alternatively, the push notification includes an out-of-channel push notification sent to the user via the various communication channels, such as an email or text (SMS) message prompting the user to interact with a hyperlink to indicate to the provider server 106 that the user actually interacted with the user device 114 that originated the transaction.

When an enrollee-user registers a new user account with the analytics system 101 or service provider system 103, the identity app or the end-user device 114 transmits various types of enrollment data. The identification server 102 generates one or more new database records in the analytics database 104 (e.g., account database, identity database) and includes the various types of enrollment data as portions of the user account data in the analytics database 104. Non-limiting examples of the enrollment data stored in the user account data may include media data as enrollment biometric samples (e.g., enrollment voice samples with enrollment utterances; enrollment visual media samples with face images); identities of the enrollee (e.g., name, decentralized identity of one or more services, public key, ANI, email address, physical address, login credentials, alias or handle, customer no., client no., employee no., SSN, driver's license no., MAC address, Bluetooth ID); associated user accounts or account groups (e.g., members of a household); indicators of the end-user devices 114 associated with the user account; one or more enrolled geographical locations or travel patterns (e.g., address, city, state, town, office address, GPS coordinates); and one or more computing services 105 or end-user devices 114 associated with one or more identities in the user account (e.g., media streaming services, smart assistant software, autonomous or semi-autonomous vehicles, smart home IoT management services).

In this way, the enrollee's new user account behaves as a federated user identity account that functions as a single source of biometric-based identity management information across any number of service provider systems 103. The identification server 102 is aware of the login or personal identifying information (PII) that the end-user devices 114 or the provider server 106 might reference as a purported identity claim asserted by the end-user during a transaction across any number of service provider systems 103. In operation, the identification server 102 receives authentication requests from a variety of service provider systems 103, providing disparate asserted identity claims. By accessing the federated user account data for the enrolled user, the identification server 102 nevertheless maintains awareness of the enrolled user's information (e.g., voiceprint, faceprint, device-prints, context-prints, identities) despite the disparate types of information received from the different service provider systems 103. As such, the enrolled-user need not enroll separately for each of the service provider systems 103 in order for the service provider systems 103 to benefit from the services of the analytics system 101.

The identification server 102 executes machine-executed software for implementing one or more machine-learning architectures comprising any number of layers configured to perform certain operations, such as audio data ingestion, pre-processing operations, data augmentation operations, embedding extraction, loss function operations, and classification operations, among others. To perform the various operations, the one or more machine-learning architectures comprise any number of models or layers, such as input layers, layers of an embedding extractor, fully-connected layers, loss layers, and layers of a classifier, among others. The identification server 102 executes audio-processing software that includes the one or more machine-learning models and layers. For ease of description, the identification server 102 is described as executing a single machine-learning architecture having the embedding extractor and other engines defined by the layers of the machine-learning architecture, though multiple machine-learning architectures (including neural network architectures) could be employed in some embodiments.

Feature Extraction Functions and Types of Features

The identification server 102 executes software program performing feature extraction functions 120, defined by layers of the machine-learning architecture. The feature extraction functions 120 ingest the contact data containing the metadata and biometric data associated with the user. The contact data may include training contact data, enrollment contact data, or inbound contact data, according to the particular operational phase of the machine-learning architecture. The contact data contains biometric signals (e.g., audio signal with utterances) from the end-user device 114 or provider server 106 and extracts various types of features from the biometric signal (e.g., audio signals, imagery signals). The feature extraction functions 120 extract various types of metadata features (e.g., behavior features) and biometric features (e.g., speaker features).

The metadata features may include behavioral features, based upon data or metadata indicating user behaviors when operating an end-user device 114 or interacting with a computing service 105. As users often develop habits or patterns when operating the end-user device 114 or the computing service 105 that the context engine 122d may leverage to limit the identity space that the identification server 102 queries. Non-limiting examples of behavioral features include how the user holds the end-user device 114 (e.g., angle/orientation measured from a gyroscope of the end-user device 114): where the user is situated relative to the end-user device 114 (e.g., distance/angle measured using the audio signal or image data captured by a camera or microphone); velocity or density of transaction requests submitted to the computing service 105 over time; or the vocabulary or content of voice interactions: among others.

The metadata features may include temporal features, based upon time-related metadata, such as timestamps of the metadata, timestamps of the analytics databases analytics database 104, or time-related data derived from such time-related metadata, time of the day, day of the week, and the like. Often, the user interacts with the end-user device 114 or computing service 105 on a periodic basis. For example, a coffee machine in the break room in the morning, a voice assistant device 114c in a conference room for a weekly meeting, or a smart television 114d to stream cartoons on Saturday mornings. In some implementations, the identification server 102 may treat such periodicity for periodic users as a form of identity that the identification server 102 may match against a query. For example, the identification server 102 receives the inbound contact of a transaction request that involves a voice assistant device 114c, at 9:00 am on a Wednesday, then extracts time-related features (and other types of features) and one or more feature vector embeddings, and match these features or embeddings against the time-related features or feature vectors of other identities that regularly use the device around 9:00 am on Wednesdays.

The metadata features may include spatial features (sometimes referred to as location features), based upon location-related metadata or other types of metadata indicating the location of the end-user or end-user device 114. In some cases, the identification server 102 may determine the location data based upon identifying a set of end-user devices 114 or identities within proximity to the end-user device 114 (e.g., within threshold distance of the end-user device 114). The proximity threshold may be configurable for one or more end-user devices 114 by the end-user or administrative user. Non-limiting examples of metadata used for extracting the location-related features include GPS or geographic coordinates or address(es), Bluetooth IDs, WiFi SSIDs, and IP address(es). The end-user device 114 may provide the spatial metadata, or the identification server 102 may determine the spatial metadata using the metadata of other end-user devices 114 when the end-user devices 114 interact.

The metadata features may include a physical space feature, indicating a type or nature of the location in which the end-user device 114 or the user is located, such as a public space or type of space (e.g., cafe, restaurant, train station, airport, hospital, workplace) or a private space or type of space (e.g., house, workplace). The administrator user of the provider server 106 or computing service 105 may configure the categories or types and include training labels for training data indicating the type or nature of the space. In some cases, detecting the type of the space may be enhanced through acoustic "scene detection" executed by the machine-learning architecture, using audio features extracted by the feature extraction functions 120 and may be included the physical space features extracted from a set of contact data, allowing the machine-learning architecture to further determine the user's surroundings (restaurant, train station, airport, home), and/or whether the space is crowded (public, untrusted) or not (private, trusted). As explained further, a public or crowded space may be untrusted and may require a higher level of confidence in the identity match or for authorizing the particular type of requested transaction.

The metadata features may include speaker voice attributes, such as a language, gender, and age of the user. The feature extraction functions 120 may extract voice attribute features from speaker audio signals. Additionally or alternatively, the feature extraction functions 120 receives certain types of data or voice attribute features from the end-user device 114 (e.g., during enrollment) or from the provider server 106. In some embodiments, the voice attributes may limit the identity space to a particular language, gender, and age of potentially matching identities.

The metadata features may include user facial attributes, such as gender, skin color, age, and eye color, which the feature extraction functions 120 extracts from image data of the user's face. The user face attribute features may limit the identity space to particular skin color, gender, and age bracket.

The metadata features may include user attributes, such as name, address, and phone number provided with a transaction request and voice command. In some cases, computing devices of the provider server 106 or service provider system 103 capture the user attribute features and forward the user attribute features to the identification server 102. For instance, a computing device of a call center agent may capture user attribute information (e.g., caller identifiers or caller-related information) during voice interactions via a phone channel. The user attribute features may limit the identity space of potential identities. Non-limiting examples of the user attributes may include identity claim information (e.g., access credentials of the end-user device 114 or computing service 105), email address, driver's license number, license plate number (e.g., extracted from video image, entered by the user). In some cases, in a voice transaction, a user may actively or passively provide user attribute features (or other types of features) that limit the identity search space.

The metadata features may include device-identifying features (sometimes referred to as device-related features or device features) indicating the particular end-user device 114. In some instances, the provider server 106 or identification server 102 include a non-transitory storage that functions as a device identity cache containing a log or cache of various identities that used the end-user device 114 recently. The device identity cache may, for example, a log containing identities or other information for some amount (n) of identities (e.g., last n identities) that used the end-user device 114 or computing service 105. In some cases, the device identity case includes a policy, such as Least Recently Used (LRU), to remove identities at a cache storage threshold, such as when n identities have used the end-user device 114. In some cases, if the cache is unwanted for the end-user device 114, then the user or administrative use may configure n as 0. Additionally or alternatively, the identity cache associates a time-to-live (TTL) threshold for the identities, such that the identity cache or other computing device removes an identity from the cache after an expiration of the corresponding TTL. For many types of end-user devices 114, users who recently used the particular end-user device 114 are likely to reuse the end-user device 114 again in the near future. The identification server 102 compares the device-features and/or the identities recently associated with the end-user device 114 during a voice transaction against the device-features or identities in the inbound data received from the computing service 105.

The metadata features may include transaction context feature, which include a type of transaction and transaction-related metadata or information, such as the timestamps, the transaction request's targeted function or feature, the transaction request's targeted resource (e.g., end-user device 114, computing service 105), and access rights requirements, among others. The transaction context indicates, or implies to the identification server 102, what the end-user intends to accomplish, or indicates the features or resources the user intends to access. The user might routinely perform various types of transactions, thereby establishing a detectable pattern. The type of transaction and details of the transaction limit the queried identity space. In some cases, the analytics database 104 includes a log of transaction requests containing identities and timestamps, among other types of transaction-related metadata and information.

The metadata features may include transaction risk, indicating the transaction risk (e.g., amount at risk, nature of risk, numerical value for severity of risk level). In some cases, the administrative user of the analytics system 101 or the service provider system 103 enters user inputs indicating the transaction risk for the types of transaction contexts or transaction-related features, allowing the analytics system 101 to forgo certain operations of the machine-learning architecture for determining the transaction risk, or allowing the machine-learning architecture to train the functional engines 122 with labeled transaction-related training data or to extract certain types of enrollee embeddings for the enrollee-user. In some embodiments, the identification server 102 or provider server 106 computes the transaction risk using a handcrafted set of rules and operation or by applying layers of the context engine 122d, described further below. Generally, for example, a higher transaction risk (e.g., amount at risk, numeric risk level) may instruct the identification server 102 or the computing service 105 to require a higher the level of confidence value associated with the identity match generated by the identification server 102.

The metadata features may include voice spoofing detection features that indicate the likelihood of a type of spoofing or fraud involved in the contact data. The types of spoofing include, for example, replay, deepfake audio, or voice distortion attacks. Various types of functional engines 122 for spoof detection may be trained to detect if a speech utterance is genuine, replayed, distorted, or synthesized, and applied to the (enrollment and inbound) contact data. Voice spoofing detection can be used in the Risk Engine model to influence the risk level. Examples of spoof detection machine-learning architecture operation may be found in U.S. application Ser. Nos. 16/841,473, and 16/841,473, each of which is incorporated by reference in its entirety herein. The risk engine 122a may, for example, determine a likelihood of spoofing and adjust the risk score.

The biometric features include voiceprint-related features (sometimes referred to as speaker or voice features) used for generating a speaker embedding vector using the speaker features extracted by the feature extraction functions 120 from voice samples of audio signals. The speaker embedding is a mathematical representation of a speaker in contact data that focuses solely on the voice portion of the audio signals. In operation, the feature extraction functions 120 extract the speaker features from an audio signal, and the identification server 102 executes the voice bio engine 122c to derive the speaker embedding by applying a GMM-based system (e.g., i-vectors) on the speaker features or by applying DNN-based systems (e.g., x-vectors, CNN vectors) on the speaker features. The voice bio engine 122c uses the voiceprint features to enroll a speaker or to predict against an enrolled speaker. For instance, when registering a new enrollee-user, the feature extraction functions 120 extracts the voice-related features from one or more enrollment audio signals of the enrollment data, the voice bio engine 122c extracts multiple enrollment speaker embeddings, which the identification server 102 then algorithmically combines to generate the enrolled voiceprint. Additional details of the voice bio engine 122c are described below.

The biometric features include faceprint-related features (sometimes referred to as image features or facial features) used for generating a facial embedding vector using the user's facial features extracted by the feature extraction functions 120 from image samples of image data. The facial embedding is a mathematical representation of a user's face in the contact data that focuses solely on imagery of the user. In operation, the feature extraction functions 120 extract the facial features from image data, and the identification server 102 executes another bio engine (not shown) of the functional engines 122 to derive the facial embedding by applying DNN-based systems (e.g., x-vectors, CNN vectors) on the facial features. The facial-recognition bio engine uses the faceprint-related features to enroll a user's face or to predict against an enrolled user's face. For instance, when registering a new enrollee-user, the feature extraction functions 120 extracts the faceprint-related features from one or more enrollment images of the enrollment data, the facial-recognition bio engine extracts multiple enrollment facial embeddings, which the identification server 102 then algorithmically combines to generate the enrolled faceprint.

As mentioned, the functional engines 122 of the machine-learning architecture extracts various types of metadata embeddings from the metadata in the contact data or biometric embeddings from the audio signal or other biometric data (e.g., image data) by executing any number or types of trained machine-learning architectures, such as neural network architectures (e.g., deep neural networks (DNNs), convolutional neural networks (CNNs)), or a Gaussian Mixture Model (GMM), among other possible types machine learning methods.

During training operations for some or all of the layers or functions of the machine-learning architecture, the identification server 102 applies the machine-learning architecture on a set of training contact data obtained from one or more corpora of training data, which may be stored in the analytics database 104, the provider database 108, or other data sources.

In some implementations, the identification server 102 trains the functional engines 122 by separately applying the functional engines 122 on the training data and independently tuning the hyper-parameters. For example, the identification server 102 may train the voice bio engine 122c on the training data independent from training the other functional engines 122, such as a facial bio engine (not shown).

In some implementations, the identification server 102 trains the functional engines 122 in an integrated fashion by applying the functional engines 122 on the training data and tuning the hyper-parameters collectively across the functional engines 122. For example, the identification server 102 may train the context engine 122d as a collection of any number of functional engines 122. In this way, feature extraction functions 120 extracts a plurality of types of features and the context engine 122d generates a context feature-vector representative of the plurality of type of features, rather than extracting, for example, a first feature-vector representative of the device-related features and second feature vector representative of the user behaviors.

Continuing with the training operations, the machine-learning architecture outputs a predicted output for each instance of applying the machine-learning architecture on the training data. The identification server 102 determines a level or error between the predicted output and expected output indicated by labels or clustering distances, and continues to train the machine-learning architecture until the level of error satisfies a training completion threshold.

In some instances, the identification server 102 disables one or more layers or functions of the trained machine-learning architecture prior to the enrollment and/or deployment phases. For instance, in some implementations, certain functional engines 122 or layers of the machine-learning architecture need not generate a classification or output after training, and need only extract a feature vector or embedding for the given enrollment data (during enrollment) or the inbound contact data (during deployment).

During an enrollment operation of the machine-learning architecture for the enrollee-user, the identification server 102 applies some or all of the machine-learning architecture on the enrollment data to extract one or more enrollment feature vectors from the features extracted by the feature extraction functions 120. The identification server 102 then algorithmically combines (e.g., averages) each of the enrollment feature vectors (as extracted from the enrollment data) to generate an enrollment embedding of a given type (e.g., voiceprint, context-print, faceprint) using the one or more enrollment feature vectors.

As an example, the identification server 102 generates an enrollee's voiceprint for the enrollee's voice by applying a trained voice biometric engine on the enrollment audio signals of the enrollment contact data. The feature extraction engine 120 extracts speaker-related features (e.g., MFCCs) from each particular enrollment audio signal, and the voice biometric engine 126 extracts an enrollment-speech feature vector from the speaker-related features of each particular enrollment audio signal. The voice biometric engine 126 then generates the enrolled voiceprint by algorithmically combining each of the enrollment-speech feature vectors. The identification server 102 then stores the enrolled voiceprint into one or more databases 104, such as the voiceprint database 104b, as user account data associated with the particular enrollee-user.

As another example, the identification server 102 generates an enrolled context-print embedding for an enrollee's contextual "scene" (e.g., public setting, private setting, at home, at work, at school, at expected location, at unexpected location) or transaction context (e.g., transaction or function offered by the service provider system 103 that the end-user intended to access) by applying a trained context engine 128 on transaction context data within instances of the enrollment contact data. The feature extraction 120 extracts various types of transaction context features from the particular instances of the enrollment contact data, such as requested transaction contexts (e.g., processes accessed), and geographical data (e.g., geographical location data for the end-user or end-user device 114 at enrollment time or in the enrollment metadata), or audio features (e.g., background noise in enrollment audio signals), among others. The context engine 128 extracts a transaction-context feature vector from the transaction context features, as extracted from the particular instance of the enrollment contact data. The context engine 128 then generates the enrolled context-print by algorithmically combining each of the transaction-context feature vectors. The identification server 102 then stores the enrolled context-print into one or more databases 104, such as the identity database 104a, in the user account data associated with the particular enrollee-user.

During deployment operations of the machine-learning architecture, the identification server 102 applies some or all of the trained machine-learning architecture on inbound contact data to extract one or more inbound feature vectors from the inbound features. In some instances, the inbound feature vectors are the inbound embeddings (e.g., inbound voiceprint). In some instances, the identification server 102 algorithmically combines (e.g., averages, concatenates, convolves) one or more inbound feature vectors (as extracted from the inbound contact data) to generate one or more inbound embeddings. The identification server 102 executes programming for determining similarity scores based upon a distance (or other algorithm) between the inbound embeddings and the corresponding enrolled embeddings of one or more enrollees.

In some approaches often determine the similarity scores based upon distances between the inbound embeddings (e.g., the current end-user's inbound voiceprint) compared to any number (e.g., ten, hundreds, hundreds of thousands, millions) of corresponding enrolled embeddings. Performing comparative operations to determine the similarity scores using an open universe or vary large universe of potential enrollee embeddings (e.g., ten, hundreds, hundreds of thousands, millions). Embodiments described herein include various operations that limit the scope of the query space of potential enrollee embeddings that the identification server 102 analyzes.

As an example, the identification server 102 executes the layers of the machine-learning architecture defining the identification engine 122b, which queries the identity database 104a for an enrolled identity having enrolled embedding vectors (e.g., enrolled context-print, enrolled behavior-prints, enrolled device-prints) having a similarity score within a threshold distance to a corresponding inbound embedding vector (e.g., inbound context embedding, enrolled behavior-prints, enrolled device-prints). In some cases, the identification server 102 queries all or most of the enrolled embeddings stored in the identity database 104a to identify a set of predicted identities having enrolled embeddings with similarity scores satisfying the similarity score threshold. Downstream, the identification server 102 applies the more resource-intensive voice bio engine 122c for voice recognition on inbound speaker-features to generate the inbound voiceprint, and determine the similarity scores between the inbound voiceprint and the enrolled voiceprints of each of the predicted identities. In this way, the voice bio engine 122c need not generate similarity scores for all or most of the enrolled voiceprints.

In some implementations, the identification server 102 receives certain types of data from the provider server 106 or end-user device 114 that expressly limit the scope of the query to the set of predicted identities, or the identification server 102 derives certain types of information that limit the scope of the query to the set of predicted identities. For instance, the inbound contact data from the end-user device 114 or provider server 106 includes the user's asserted identity claim. The identification server 102 queries the identity database 104a for a user data record having an enrolled identity matching to the identity claim. The identification server 102 may then evaluate the other forms of data (e.g., voice biometrics) to identify or authenticate the end-user, using only the enrolled data and enrolled embeddings in the particular user data record.

Additional examples of training, enrollment, and deploying machine-learning architectures for identifying and authenticating end-users may be found in U.S. application Ser. Nos. 16/992,789, 17/231,672, and 17/491,292, each of which has been incorporated by reference in its entirety.

The context engine 122d includes layers of the machine-learning architecture for predicting or classifying the transaction context, thereby predicting what the user intends to achieve through the transaction or the purpose of the transaction. In some cases, the context engine 122d implements various speech-to-text operations that generate a transcription of the voice samples extracts features from the transcription or other inputs (e.g., DMTF tone inputs or IVR tone or voice inputs indicating a desired transaction) and metadata received from the user device 114 or computing service 105. The context engine 122d may predict what the user is trying to achieve and determines a transaction risk based upon the transaction context or user inputs. In some embodiments, some or all of the functions of the context engine 122d may be performed by the service provider system 103 (e.g., provider server 106), where the computing service 105 sends the transaction context data and/or the transaction risk value to the identification server 102.

In some embodiments, the context engine 122d extracts a context-print embedding as a feature vector representative of multiple types of features, extracted from the contact data (e.g., training data, inbound contact data, enrollment contact data). For instance, the machine-learning architecture includes the functional engines 122 trained to recognize various types of metadata features, such as a device recognition engine trained to recognize devices by extracting a device-print embedding as a feature vector representative of device-identifying metadata, and a behavior recognition engine trained to recognize user behaviors by extracting a behavior-print embedding as a feature vector representative of user behaviors, among others. In some embodiments, the context engine 122d may concatenate or otherwise algorithmically combine the various types of metadata embeddings to form the context-print for the inbound contact data or enrollment data.

In operation, the identification server 102 obtains the contact data and applies the context engine 122d on the contact data (or features extracted from the contact) to generate the context feature vector or context-print, and in some cases, classify the context. The identification server 102 obtains the contact data and various types of features by receiving the contact data from the provider server 106, the provider databases 108, the analytics databases 104, or the end-user device 114. In some cases, the identification server 102 obtains the contact data by deriving the contact data or features based upon the contact data received from another device of the system 100. Downstream, the identification server 102 may reference the context embedding generated by the 112d using the contact data to determine a set of potential identities by applying the identification engine 122b, determining potential risk score by applying the risk engine 122a, and predicting a likely identity of the inbound user of the end-user device 114 by applying the voice bio engine 122c using only the enrolled voiceprints of the set of potential identities generated by the identification engine 122b, among other possible uses of the context embedding from the context engine 122d.

Risk Engine

The risk engine 122a may determine or adjust a predicted level of risk associated with the transaction context determined by the identification server 102. The predicted level of risk may be reported as a separate value to the provider server 106 in an authentication notification. In some implementations, the identification server 102 adjusts the similarity threshold referenced by the functional engines 122 for predicting that one or more embeddings of the inbound user are within a threshold similarity to corresponding embeddings of an enrolled user.

In some embodiments, identification engine 122b or identification server 102 generates the identification result and selects the set of potential identities based upon the risk score. In such embodiments, the machine-learning architecture may apply the risk score against the similarity scores of potential candidates before sending the selected the potential identities to the voice bio engine 122c, or before the identification server 102 sends an identification result notification to the provider server 106. In some embodiments, the risk engine 122a and context engine 122d comprise overlapping layers or functions. In some embodiments, the risk engine 122a and the context engine 122d are the same functional engine 122.

The risk engine 122a is trained and developed on various types of transaction contexts to determine context risk level values corresponding to the types of transactions. In this way, the risk engine 122a generates a risk score for a given classification of the transaction context (what the user is attempting to do). In some case, the identification server 102 further trains or develops the risk engine 122a by applying the risk engine 122a on various types of fraud-related features, risk-indicator features, and fraudulent feature vectors, where the risk engine 122a is trained to adjust the risk level based upon features or feature vectors extracted from contact data suggesting fraud or elevated risk.

Identification Engine

The identification engine 122b ingests all of the extracted features and the risk score from the risk engine risk engine 122a and applies a neural network architecture to detect a set of potential user identities. The identification engine 122b extracts an inbound context embedding or the identification server 102 applies the identification engine 122b on the inbound context embedding to determine whether the inbound context embedding is within a threshold distance to an enrolled context embedding of the identities in the identity database 104a. In some cases, the identification engine 122b fuses a plurality of disparate enrolled embeddings to generate the enrolled context-print. In some cases, the identification engine 122b (or other component of the machine-learning architecture, such as the context engine 122d) extracts the enrolled context-print for the enrolled user directly from the plurality of types of enrollment metadata features extracted from the enrollment data. The identification engine 122b compares the inbound context embedding against each of the enrolled context embeddings to identify a set of candidate identities having a threshold similarity to the inbound context embedding. For the set of candidate identities, the identification engine 122b selects a threshold number of potential identities for the voice bio engine 122c to query against the enrolled voiceprints in the voiceprint database 104b.

System Databases

The system 100 includes any number databases 104, 108 hosted by any number of computing devices having comprising non-transitory machine-readable storage and processors configured host and query various types data records, and capable of performing the various tasks and processes described herein. For example, the analytics server 102 may host or be in communication with the analytics database 104, and the provider server 106 may host or be in communication with the provider database 108, where the databases

104, 108 may receive and stored the various types of contact data and user registration or enrollment data. In some embodiments, the analytics databases 104 and/or the provider databases 108 may contain any number of corpora of training audio signals that are accessible to the identification server 102. In some embodiments, the identification server 102 employs supervised training to train the neural network, where the analytics database 104 includes labels associated with the training audio signals that indicate which signals contain speech portions. The analytics server 102 may also query an external database (not shown) to access a third-party corpus of training audio signals. In some implementations, the analytics database 104 and/or the provider database 108 may contain the various enrollment contact data, extracted features, and extracted embeddings generated by the identification server 102 during an enrollment operation for the user.

For instance, the analytics databases 104 includes the enrollment data for enrolled users, including data for the embeddings, features, identities, end-user devices 114, computing services 105, and other user identities associated with the particular enrolled user. The analytics database 104 may further include a log or history of authentication requests in which the identification server 102 performing an identification process for one or more user identifiers for a transaction request at a particular computing service 105. The identification server 102 or provider server 106 may update the log based upon an authentication result associated with the particular user and computing service 105.

Figure 1B:
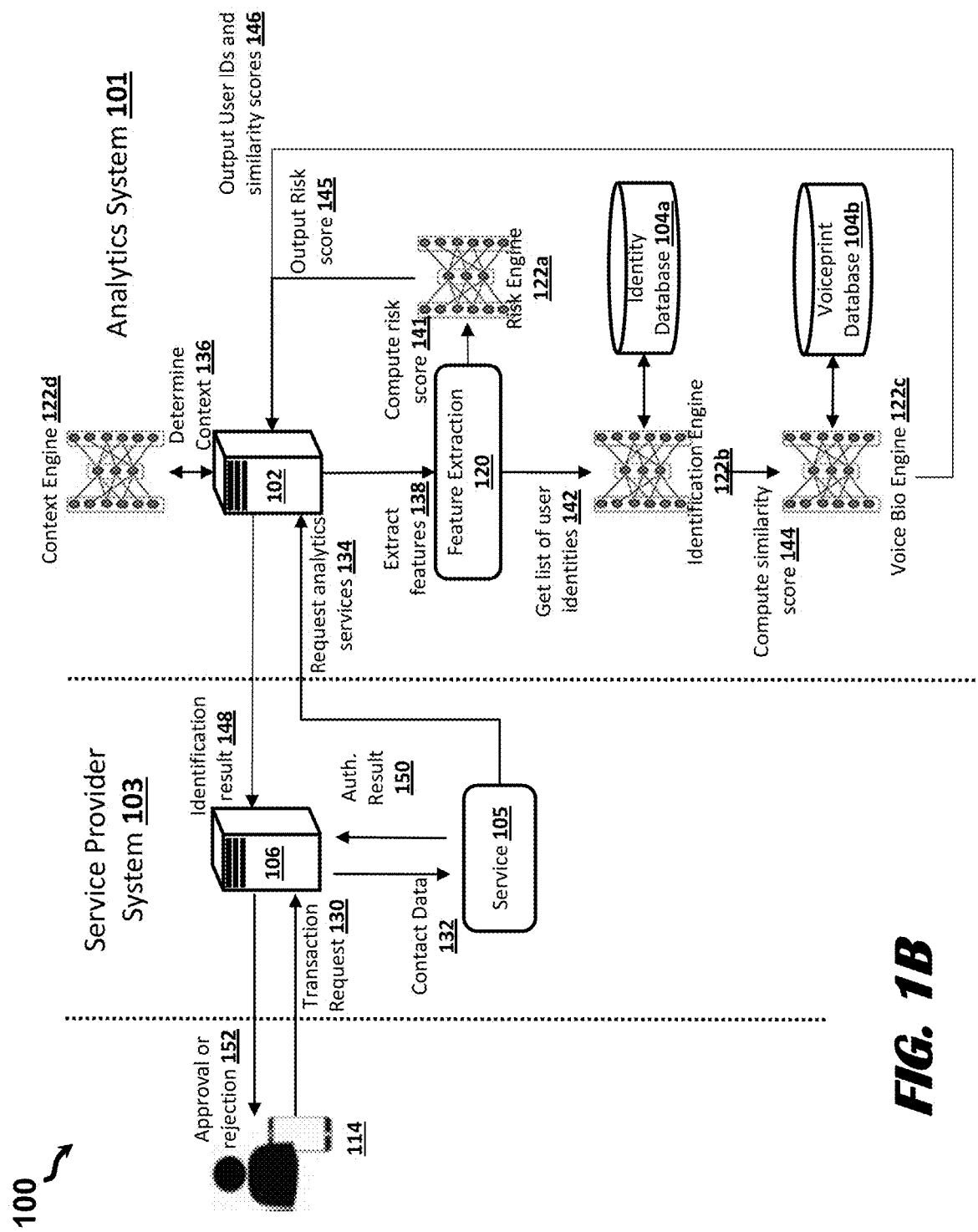
FIG. 1B shows data flow of components of the system for implementing the one or more machine-learning architectures having the layers or functions defining the one or more functional engines, according to an embodiment.

FIG. 1B shows data flow of components of the system 100 for implementing the one or more machine-learning architectures having the layers or functions defining the one or more functional engines 122. In the example data flow, the components of the service provider system 103 and analytics system 101 perform functions for identifying the user in a trusted or non-trusted space (e.g., real-world location or environment), when the user attempts to access (e.g., log into, operate) a new device 114 or software program on the new device 114 for the first time or after an access expiration period. As such, the user has not yet established the user's identity, or the user's identity lapsed on the new device 114, due to the user's most recent access attempt exceeding a threshold expiration period. The system 100 may authenticate the user based upon the user's trust of the device 114 or the trust of the contextual scene. For example, the user wants to authenticate against a new device 114 that he/she trusts or the user is situated in a trusted space (e.g., home). As another example, the user wants to authenticate against a new device 114 that he/she does not trust or the user is in a public space (e.g., coffeehouse). The analytics system 101 infers the user's identity among a set of user(s) and authenticates the user based upon, for example, the user's voice, various metadata, and risk indicators.

In operation 130, the user interacts with the user device 114, prompting the user device 114 to initiate a new function of the end-user device 114 or access a new computing service 105 hosted by the provider server 106. The user device 114 transmits a transaction request to the provider server 106.

In operation 132, the provider server 106 invokes the computing service 105 by sending an authentication request to the computing service 105. The authentication request includes various types of inbound contact data received or otherwise captured from an instruction the user device 114, such as a device identifier, a voice command, and various metadata.

In operation 134, the computing service 105 sends a request for analytics services and operations to the identification server 102. The request invokes various analytics and operations of the identification server 102 for analyzing the inbound contact data and identifying the end-user. These functions include, for example, extracting and modeling features for certain aspects of the inbound contact data, such as biometric data and features for the end-user (e.g., voice-related audio data, speaker recognition features, face imagery data and facial recognition features); device-related data and features (e.g., device identifiers, metadata associated with the user device, device recognition features); behavior data and features for the end-user; and transaction context riskiness, among various others.

In operation 136, the identification server 102 executes software programming of layers and functions to detect the transaction context from the contact data. In some cases, the identification server 102 detects the context according to a rules-engine that determines the context based upon certain types of contact data received from the provider server 106. In some cases, the identification server 102 applies the feature extraction functions 120 on the contact data to extract the various types of features for detecting the context. The identification server 102 applies the context engine 122d on the inbound contact data to generate the context embedding for the inbound contact data. The context engine 122d extracts predicted transaction context attributes, such as a predicted transaction context (e.g., category of activity or the user's intended outcome) and/or a predicted transaction risk score.

In some embodiments, the computing service 105 includes software programming for performing some or all of the features and functions of the context engine 122d, where the context engine 122d may compute a transaction risk score using various portions of the inbound contact data, such as the voice command or the converted speech. The context engine 122d may output the context in any number of values or representations, which may include values or vectors for the transaction context distinct from values or vectors for the transaction risk score, or values or vectors for the transaction context integrated or algorithmically combined with the transaction risk score.

In operation 138, the identification server 102 executes a feature extraction function 120 that extracts various types of features using the inbound contact data (e.g., biometric features, metadata features, behavior features, user attribute features). After extracting the features, the identification server 102 applies layers and functions of various functional engines 122 of the machine-learning architecture(s) on the corresponding types of extracted features. In some cases, the identification server 102 applies the feature extraction functions 120 to extract features to detect the context for the requested transaction.

In operation 141, the identification server 102 computes a risk score by executing a risk engine 122a on the extracted inbound features. The risk engine 122a ingests the extracted inbound features and applies a DNN classifier to predict a risk score, which the risk engine 122a outputs as a classification level of risk or as a risk score representing a likelihood of fraud or other threat.

In operation 142, the identification engine 122b uses extracted features and enrolled features of registered identities stored in the identity database 104a to predict a list of potential users. The identification engine 122b receives the context embedding from the context engine 122d or the identification engine 122b ingests all the extracted features for the contact data and the score from the risk engine 122b extracts the context embedding. The identification engine 122*b* then compares the inbound context embedding against each of the context embedding for the enrolled users in the identity database 104*a* to identify the set of identities associated with the context-prints having a nearest similarity score to the inbound context-print. In implementations, the identification engine 122*b* adjusts the similarity score threshold for selecting a potential identity according to the risk score.

In operation 144, the identification engine 122*b* sends a current inbound voiceprint and the list of potential user identities to the voice bio engine 122*c* to compute similarity scores between the current inbound voiceprint (extracted from the inbound voice sample of the inbound contact data) and the list of potential users.

The identification server 102 generates a final identification or authentication score. In operation 144, the risk engine 122*a* sends the risk score to identification server 102. In operation 145, the voice bio engine 122*c* queries a voiceprint database 104*b* to retrieve the enrolled voiceprints associated with the set of potential identities. Using the enrolled voiceprints of the potential identities, the voice bio engine 122*c* computes a similarity score for each potential identity indicating a similarity or distance between the enrolled voiceprint and the inbound voiceprint extracted for the end-user. The voice bio engine 122*c* then feeds the voice similarity scores and the enrolled voiceprints satisfying a matching threshold to downstream operations.

In operation 148, the identification server 102 determines a predicted identity of the end-user and sends an identification result to the provider server 106. In some cases, the identification server 102 selects, as the predicted identity, the identity having the best performing similarity score(s) that satisfy the threshold(s) from the embedding comparison(s). The identification server 102 uses the voice similarity scores (from operation 146) and the risk score (from operation 145) to determine and select a most likely voiceprint match to predict the current identity of the user. The identification server 102 then transmits a notification to the provider server 106 and/or computing service 105, where the notification indicates, for example, the identification result and any output details referenced by downstream computing operations of the provider server 106, or by personnel (e.g., fraud analysts, system administrators) of the service provider system 103. For instance, the notification may include the identification result and outputted transaction context data generated by the context engine 122*d*.

In operation 150, the computing service 105 (or other software function of the provider servers 106) generates an authentication result based upon the various types of data in the identification result notification received from the identification server 102. The computing service 105 determines whether to authenticate and permit the user and/or the user device 114 to access or perform the requested functionality in the transaction request. For instance, the computing service 105 determines whether to permit the end-user to access the user device 114 for the very first time because the identification results indicate that the end-user is a registered user whose current voiceprints satisfactorily match to the user's enrolled voiceprints (in the voiceprint database 104*b*). In some implementations, the determining that the user is a registered user (or failing to do so) may be sufficient to transmit an approval or denial notification to the user device 114.

The computing service 105 may determine whether to authenticate the user or user device 114 based upon any number of additional or alternative determinations generated by the analytics and functions of the identification server 102. As an example, the identification results indicate that this user previously registered one or more enrolled identities (in the identity database 104*a*) matching to one or more corresponding identity claims implicitly or explicitly asserted by the inbound contact data. As another example, the identification results data indicate that, according to the database records of the one or more analytics databases 104, the user was previously authenticated by the service provider system 103 for a prior transaction request using one or more enrolled identities of the user, but the user was using one or more different user devices (not shown) than the user device 114 used for the current illustrative transaction attempt. In some cases, the analytics databases 104 include a log (not shown) of authorization attempts that previously asserted one of the user's identities or other user attribute(s) as a purported identity claim for the identification processes performed by the analytics system 101.

In some implementations, the computing service 105 determines whether to authenticate the user based upon the risk score generated by the risk engine 122*a* (in operation 141). In such implementations, the identification results data include the risk score generated by the risk engine 122*a*. If the computing service 105 determines that the risk score fails to satisfy a threshold risk value, then the computing service 105 rejects the user's authentication attempt for the requested transaction.

Alternatively, the identification server 102 generates the identification results to indicate that the identification server 102 did, or did not, satisfactorily authenticate or identify the user, or indicate more explicitly that the calculated risk score satisfied, or failed, the threshold risk value. As such, the computing service 105 may approve or reject the user's authentication attempt for the requested transaction in accordance with the identification results data from the identification server 102, but without determining the impact of the risk score.

Optionally, the computing service 105 or provider server 106 generates a user interface at the computing device of an administrative user of the service provider system 103. The user interface displays some or all of the identification result data and prompts the administrative user to determine whether to authorize the end-user or user device 114 by looking at the identification result data generated by, and received from, the identification server 102.

In some implementations, the computing service 105 may determine whether to authenticate the user according to the context detect data included in the identification result data. In addition to determining whether to authenticate and approve the end-user, in some embodiments the computing service 105 determines whether to authorize access control permissions for the requested transaction features. In this way, the service provider system 103 may implement granulized, use case or feature-specific permissions and/or stepped-up permissions. For instance, even though the computing service 105 or another device of the system 100 (e.g., provider server 106, identification server 102, user device 114) successfully authenticated the user, the various contexts (or other inbound contact data) render the requested transaction too risky or otherwise not proper for authorization under the contextual circumstances.

In operation, the context engine 122*d* performs the context detection operations and generates certain context detection data, which the identification server 102 includes in the identification result data for the computing service 105. The computing service 105 may determine whether the context detection data satisfies context authorization thresholds according to configurations of the user (in the user data record) and/or according to system configurations of the service provider system 103.

As an example, the user's data record indicates the user's security access rights and the transaction request (i.e., what the user is trying to do) includes a pre-configured security access level requirement. The computing service 105 may determine whether to authorize the user to access the functions of the requested transaction by comparing the user's access rights against the security access level required for the type of transaction.

In operation 152, the provider server 106 generates and transmits the approval notification or the denial notification to the user device 114 in accordance with the authorization result notification generated by the computing service 105. The user device 114 may generate an access confirmation message comprising a visual display and/or audio recording indicating the approval notification or denial notification received from the provider server 106.

In some embodiments, the service provider system 103 includes remedial or supplemental operations offering opportunities for the user to supplement or correct the inbound contact data that improves the likelihood that the analytics system 101 and service provider system 103 successfully identify, authenticate, and authorize the user. In such embodiments, the access message may present the user with the instructions for performing the remedial operations.

For instance, the user could be an minor child of a household, where the user device 114 includes a video streaming device (e.g., Apple TV®, Roku®, Amazon FireStick®) that accesses a video streaming service 105 hosted by the provider server 406. The provider server 106 implements two types of authenticating the user's identity, including something the user knows (e.g., credentials) and something the user has (e.g., push notification to one or more user devices 114), and the provider server 106 relies upon the identification server 102 for authenticating the user's characteristics (e.g., voice biometrics). In some circumstances, the identification server 102 may require additional voice sample audio data from the user. In these circumstances, the identity app presents a user interface prompting the user to provide additional voice samples (e.g., asked to speak additional sentences to collect more voice samples). In some embodiments, the identification server 102 or the provider server 106 employs a stepped approach to authentication. Depending on the result/score from identification server 102, computing service 105 may request the user perform any number of the above-mentioned authentication tasks (e.g. send a push notification and approve, read back the OTP sent to the smartphone 114*a* via SMS)

Example Process Operations

Figure 2:
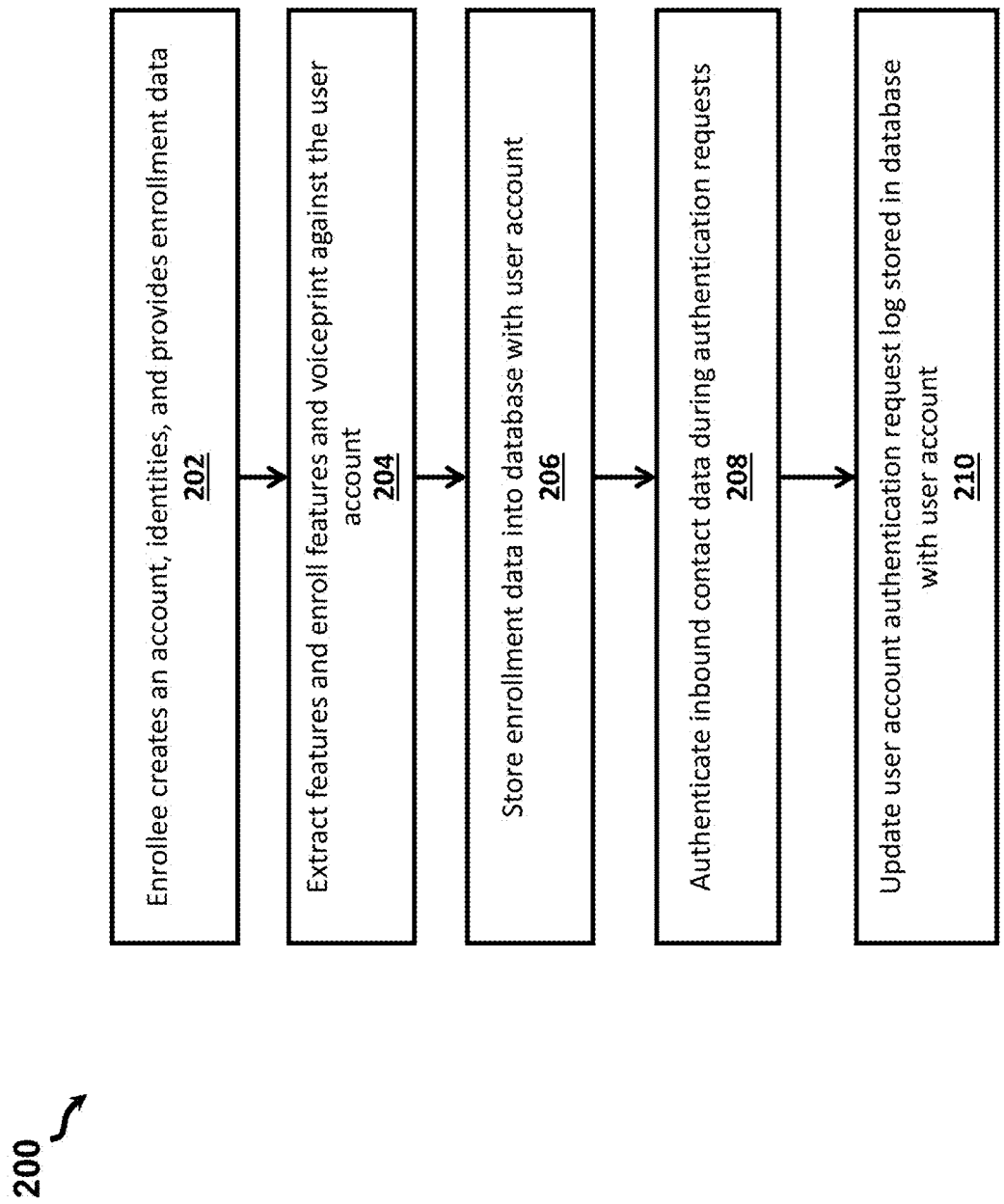
FIG. 2 shows steps of a method for new user registration and enrollment for developing one or more machine-learning models for a new enrollee-user, according to an embodiment.

FIG. 2 shows steps of a method 200 for new user registration and enrollment for developing one or more machine-learning models for a new enrollee-user. Embodiments may include additional, fewer, or different operations than those described in the method 200. A server performs the steps of the method 200 by executing machine-readable software code that includes the one or more machine-learning architectures, though it should be appreciated that any number of computing devices and/or processors may perform the various operations of the method 200.

In step 202, an enrollee-user registers a new user account with the identification system or service provider system according to various types of enrollment data. An identification server generates one or more new database records in user account databases (e.g., analytics databases 104) and includes the various types of enrollment data. Non-limiting examples of the enrollment data stored in the user account data may include media data as enrollment biometric samples (e.g., enrollment voice samples with enrollment utterances; enrollment visual media samples with face images); identities of the enrollee (e.g., name, decentralized identity of one or more services, public key, ANI, email address, physical address, login credentials, alias or handle, customer no., client no., employee no., SSN, driver's license no., MAC address, Bluetooth ID); associated user accounts or account groups (e.g., members of a household); devices associated with the user account; one or more enrolled geographical locations or travel patterns (e.g., address, city, state, town, office address, GPS coordinates); and one or more provider services or devices associated with one or more identities in the user account (e.g., media streaming services, smart assistant software, autonomous or semi-autonomous vehicles, smart home IoT management services).

In this way, the enrollee activates the user account that functions as a federated account behaving as a single source for biometric-based identity management information, across any number of provider systems. The identification server is aware of the login or personal identifying information (PII) that the user or the provider server could reference as a purported identity claim, across any number of provider services. The identification server could receive authentication requests from a variety of provider services based upon disparate types of asserted identity claims.

In step 204, the identification server extracts various enrollment features and feature vectors using certain portions of the enrollment data. Using the extracted enrollment features and enrollment feature vectors, the server then generates one or more enrolled feature embeddings (e.g., voiceprint, deviceprint, behaviorprint, contextprint for the new enrollee-user). The server may further generate one or more enrollment context-embeddings, generated based upon a plurality of types of metadata features or feature embeddings for one or more transaction request contexts.

In step 206, the server stores enrollment features and voiceprint against the user account. The user account data may further indicate one or more user identities associated with the particular user. The database may store the metadata features or values, such as Device ID, Bluetooth, GPS, and other metadata information, alongside the other user account information, such as the user identities, user devices, user services, and other related users.

In step 208, after enrollment and sign up of a user account, the user executes a transaction request and successfully authenticates the user's inbound contact data against the user's stored enrollment data. In step 210, the database updates a history log of vendors/devices and locations where the user's identity or other information (e.g., voice, face) was used to authenticate a user.

In some implementations, the identity app allows the user to access this authentication history data. In this way, the identity app presents a user interface allowing the user to review where the user's biometric information was used for positive authentication or personalization. This feature will allow the user to dispute false positives and provide feedback to the system or service provides. In some case, the user may be permitted to enable/disable biometric authentication on devices/locations that the user chooses (e.g., public devices).

Figure 3A:
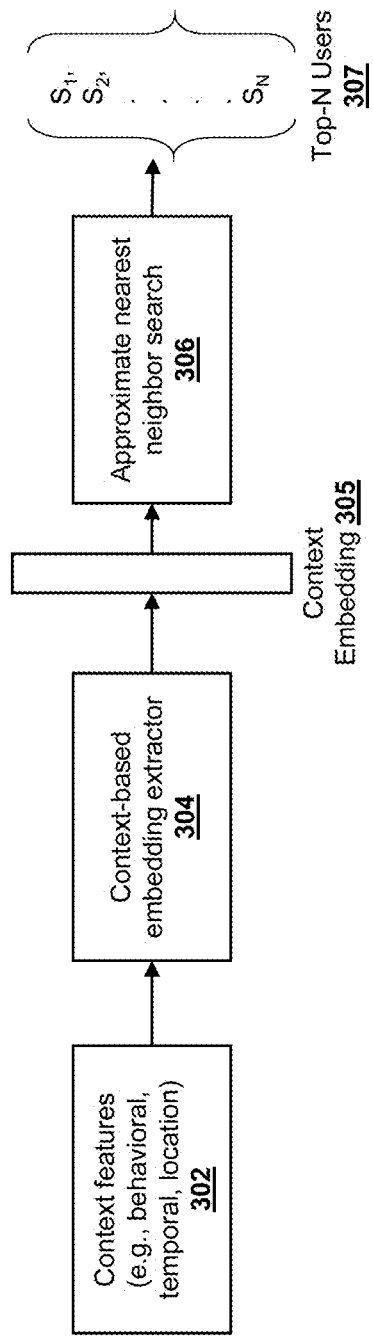
FIGS. 3A-3B shows data flow of operations and layers of an identification engine executed by an identification server, according to an embodiment.
Figure 3B:
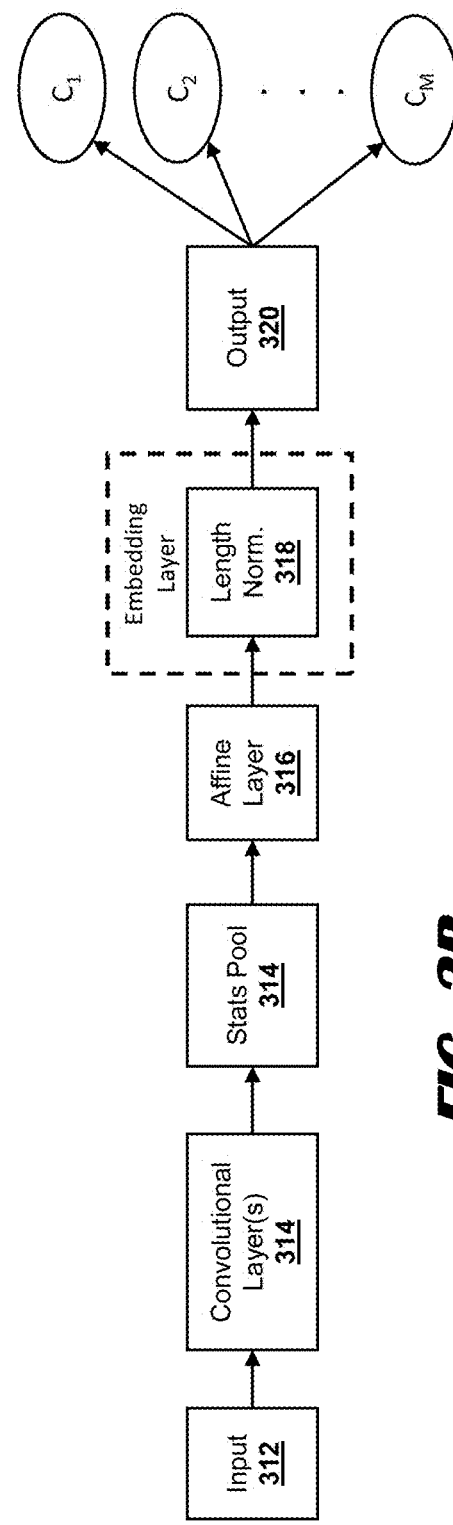

FIGS. 3A-3B shows data flow of operations and layers of an identification engine 300 executed by an identification server. The identification engine operates in two conceptual phases. Some or all of these functions may merge or otherwise overlap with the functions of a context engine as previously described. The first operational phase extracts a context embedding or context-print for every speaker interaction with a computing service. The second operational phase selects a set of one or more potential enrolled identities having one or more features, feature embeddings, or enrollee context-print within a threshold distance from the inbound context-print. The operations of FIGS. 3A-3B are described as being performed by a server (e.g., identification server 102) executing the identification engine 300, though any number of devices may execute the various functions and features associated with the identification engine 300.

In operation 302, the server extracts a plurality of types of features from the current and/or prior inbound contact data received from a current client device or from database records logging the user's interactions with one or more computing services that send identification requests to the server.

In operation 304, the server extracts the context-print 305 from the plurality of types of features, where the context-print includes an feature vector embedding as a low-level mathematical representation for all or most of the information about the types of metadata features described above (e.g., behavioral, temporal, spatial). In some cases, the server extracts a context-print 305 from the plurality of features directly. In some cases, the server extracts a plurality of types of embeddings using the plurality of types of features and then performs a fusion or combination function that algorithmically combines the disparate types of embeddings into the inbound context-print 305. In some implementations, the server extracts the various embeddings using a multi-modal DNN that takes as input the multi-modal low-level context features and outputs the context embedding 305. While at inference time (deployment phase), the DNN outputs the embeddings 305, the DNN outputs predicted context classes at training time.

FIG. 3B illustrates the DNN architecture of the identification engine 300. An input layer 312 ingests the multi-modal low-level context features extracted from the various contact data sets (in step 302). The DNN architecture includes, for example, three convolutional layers 314 (with relu activation) sequentially applied on the various context features, followed by a statistics pooling layer 314 that computes, for example, the mean and variance of the vectors of the convolutional layers 314. The DNN applies a fully-connected affine layer 315 (with linear activation), followed by a length normalization layer 318, from which the server extracts the one or more embeddings, and finally the output layer 320 estimates the correct classification indicating the predicted classified transaction context ($C_1, C_2, \ldots, C_M$). During training, the server applies a loss function, such as a Large Margin Cosine Loss (LMCL), for tuning the hyperparameters based on distances between expected outputs of training labels and predicted outputs until a threshold level or error is satisfied.

Beneficially, training and deploying/testing the multi-modal DNN system performs well despite partially missing input features or incomplete feature vectors, where some modalities (as sources of the features) have certain types of contact data completely or partially unavailable or corrupted. In some implementations, the server may detect missing, incomplete, or corrupted types of metadata features and perform remedial operations. In some cases, the server may apply the machine-learning architecture on the last (n) historical features available for the particular modality, apply the machine-learning architecture on a random sample drawn from a Gaussian distribution of the metadata features received via the particular modality, or apply the machine-learning architecture on a mean sample computed by the server from the metadata features for the particular modality.

In operation 306, after the server extracts the context embeddings 305, the second phase begins by selecting the set of potential identities, up to top-N (e.g. N=10) user identities having the top-N most similar enrolled context-prints according to an approximate nearest neighbor (ANN) search. The goal of the ANN operation is to find a set of examples in an ANN graph having a distance to the inbound context embedding 305 satisfying a predefined similarity threshold. The distance metric could be Euclidean distance, Manhattan distance, or cosine (angular) distance. In some implementations, the maximum number N can be dependent on a level of security and/or the size of the population expected by the server or administrative user. At the end of the second phase, the server shares the set of possible user identities to a voice bio engine to identify the test speaker, if any.

Figure 4:
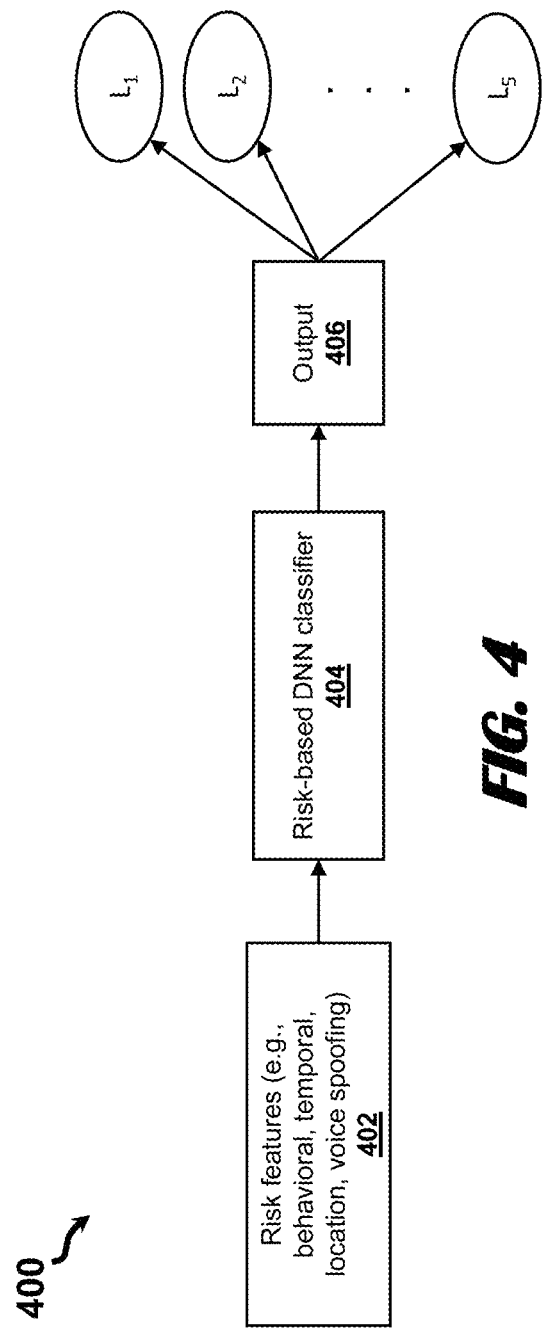
FIG. 4 shows the data flow of a risk engine executed by an identification server, according to an embodiment.

FIG. 4 shows the data flow of a risk engine 400 executed by an identification server. Some or all of these functions described in FIG. 4 may merge or otherwise overlap with the functions of other aspects of a machine-learning architecture as previously described. The operations of the risk engine 400 are described as being performed and executed by a server (e.g., identification server 102), though any number of devices may execute the various functions and features associated with the risk engine 300.

In operation 402, the server extracts various types of risk-related features of the contact metadata and/or biometric data. The server applies the risk engine 400 on the risk features enabling the server to identify the likelihood of fraud and thus limit potential fraudulent activity when the user is interacting with the current user device or computing server.

In operation 404, the server generates the risk score using any various machine-learning techniques and architectures as the risk engine 400. The risk scoring and classification may be based upon a regression approach, where a trained machine-learning model of the risk engine produces a continuous risk score (e.g. range [0, 1]), or a classification approach where the machine-learning model of the risk engine includes a DNN classifier that produces a categorical risk level (e.g. Level 1 to Level 5).

In operation 406, an output layer of the risk engine outputs the risk classification (e.g., $L_1, L_2, \ldots, L_5$) as risk levels corresponding to the risk score or risk feature vector extracted (in operation 404) by the DNN.

Additional Example Embodiments

Perform Payments Anywhere

In this embodiment, a user performs a payment anywhere using his/her voice. This includes cafes, restaurants, store checkout counters, online stores, online utility providers, train stations, or gas stations.

For instance, at a gas station, when drivers arrive to fill their gas tank, instead of inserting/tapping a payment card to authorize the payment, they can simply speak to the gas dispenser. The identification system acquires all or a subset of available metadata such as GPS coordinates of the cars that are in proximity of the gas dispenser, GPS of the mobile phones of the users, their Bluetooth information, temporal information, their names, video of the license plate, and any of the other metadata signals described in the previous section. The identification system will then process the different metadata signals and extract their corresponding features, and then runs the machine learning system to find the top-N potential user IDs. Similarly, the Risk engine will process the metadata to compute the risk score/level.

Once the potential candidates are identified, the voice biometric engine (or "voice recognition engine") compares the similarity or relative distances between the enrolled voiceprints model and the inbound embedding of the inbound speech (that the user spoke to try making the payment), and select the speaker with the maximum similarity score.

The voice similarity score, the speaker identity, and the risk score are shared with the owner service to authorize or reject the payment.

Access Secure Environment Anywhere

In this embodiment, the user gains access to a secure/gated environment anywhere using their voice. A secure environment could be a physical location: house, gated community, car, parking lot, train access, or airport TSA checkpoint. Alternatively, the location may be a digital location (accessing bank account via the bank app on your mobile device or your virtual assistant), or over the phone channel (calling your bank or your insurance company). The authentication system may facilitate secure access to each of these secure environments by authenticating the user's speech against the user's unique voiceprint.

For instance, at an airport TSA checkpoint, the user can use his/her voice to proceed to the secure areas of the airport. Information such as who is registered to fly from the airport (location) on this particular day (temporal) and around this particular hour (temporal) plays an important role in narrowing down the scope of possible travelers. Information such as the name of the traveler, the destination airport, the flight number, or simply the gate number could be also used to further narrow down the score of identity space. Additionally, voice and face attribute features could be used to further enhance the identity search.

Similarly, the user can use a voice command to open the door, trunk, or gas tank of a car or start the engine. The signals captured from the proximity remote key fobs would be of great use to limit the scope of authorized users. In this particular example, the GPS information and temporal information could have a great impact on the Risk score/level, depending on whether the area is a high-risk crime area or not, or whether it is in the middle of the night or not.

Access Personalized Content and Parental Control Anywhere

In this embodiment, the users access their own personalized content anywhere they go, for e.g. to use Alexa, Google Home, Portal, or any other virtual assistant anywhere they go: at the home, office, hotel, or car to play their favorite songs, order online, etc. Similarly, the users can access their favorite TV applications (e.g. Netflix, TiVo, Hulu, etc.) and their personalized TV content anywhere they go: at home, hotel, or Airbnb, in a very seamless way without the need to remember their personal credentials, or the risk to forget them on the temporary host TV.

With the authentication system, a family of users may enforce parental control anywhere: limiting the ability to access restricted TV content, purchase online, etc.

For this particular case, the metadata such as the list of guest names in the hotel room for a particular day (temporal), the list of employees that share the office space, the WiFi data, could be quite important to reduce the scope of possible users.

Multi-Modal Biometrics Anywhere

Similar to the use of Voice Biometrics, it is possible to use other Biometrics, like face recognition, fingerprint, or vein recognition depending on the availability of the devices (camera, fingerprint reader, or vein scanner). While technically microphones are more invasive because they are usually cheaper, smaller, have lower maintenance and higher privacy acceptance than other devices, it is possible to envision cases where that Biometrics could be used in a standalone or in a multi-modal fashion, specifically the ones that may require very high-security levels (e.g. prisons, government offices, airports).

In the example of an airport TSA checkpoint, it is possible to use face recognition as a replacement for voice biometrics, or in combination with voice biometrics. In this particular case, the user's face is first enrolled using different angles and lighting conditions. Similar to the other embodiments, metadata, voice, and/or face attributes are first used to estimate the risk level and the scope of possible travelers. Face recognition and voice Biometrics are then used to compute the biometric score that is then shared with the TSA service.

Further Example Embodiments

In some embodiments, a computer-implemented method comprises generating, by a computer, one or more enrolled biometric-prints for an enrollee-user in an enrollee-record of a database, by applying one or more biometric recognition engines of a machine-learning architecture on enrollment biometric data for the enrollee-user; receiving, by the computer, a first authentication request from a first provider server to authenticate a first inbound user, and a second authentication request from a second provider server to authenticate a second inbound user; generating, by the computer, a first inbound biometric-print and a second inbound biometric-print corresponding to the first inbound user and the second inbound user, by applying the one or more biometric engines on the corresponding first inbound contact data and the second inbound contact data; and transmitting, by the computer, a first result for the first computing service to the first provider server based upon a similarity between the first inbound biometric-print and the enrolled biometric-print in the user data record, and a second result for the first second computing service to the second provider based upon the similarity between second inbound biometric-print and the enrolled biometric-print.

In some implementations, the method further comprises updating, by the computer, the enrollee-record to indicate one or more computing services associated with the enrollee-user.

In some implementations, the method further comprises obtaining, by the computer, enrollment metadata associated with the user; and generating, by a computer, an enrolled metadata embedding for the enrollee-user by applying an identification engine of the machine-learning architecture on a plurality of types of features extracted from the enrollment metadata.

In some implementations, the method further comprises generating, by the computer, a first inbound metadata embedding for the corresponding to the first inbound user by applying the identification engine of the machine-learning architecture on the plurality of types of the enrollment data; and identifying, by the computer, in the database a set of one or more enrollee-records having corresponding enrolled metadata embeddings having a context similarity score to the first inbound metadata embedding within a context similarity threshold.

In some implementations, the computer selects from the database a set of one or more potential enrollee-records based upon a corresponding context similarity score satisfying a context similarity threshold. The set of one or more potential enrollee-records includes the enrollee-record.

In some implementations, the method further comprises applying, by the computer, a risk score engine of the machine-learning architecture on the inbound contact data of the first authentication request to generate a risk score; and adjusting, by the computer, at least one of the context similarity threshold or a biometric-print similarity threshold.

In some implementations, the method further comprises generating, by the computer, a first result indication for the first provider server based upon the first similarity score, the first similarity score indicating a likelihood that the first inbound audio signal originated from the enrollee.

The method according to claim 1, further comprising determining, by the computer, a first similarity score based upon a distance between the first inbound biometric-print and the enrolled biometric-print in the user account for the enrollee.

In some implementations, the method further comprises obtaining, by the computer, enrollment data of the enrollee for the user account, the enrollment data including one or more enrollment audio signals containing one or more utterances of the enrollee-user; extracting, by the computer, a plurality of enrollment features from the one or more enrollment audio signals for the enrollee-user; and generating, by the computer, an enrollment voiceprint of the one or more enrollment biometric-prints by applying the machine-learning architecture on the plurality of enrollment features.

In some implementations, the method further comprises authenticating, by the computer, the first inbound user as the enrolled-user associated with the identified enrolled biometric-print, based upon the similarity between the first inbound biometric-print and the enrolled biometric-print in the user data record.

In some embodiments, a system comprises a database and a computer. The database comprises a non-transitory machine-readable storage configured to store a plurality of enrollee-records for a plurality of enrollee-users. The computer comprises a processor and is in communication with the database. The computer is configured to generate one or more enrolled biometric-prints for an enrollee-user in an enrollee-record of the database, by applying one or more biometric recognition engines of a machine-learning architecture on enrollment biometric data for the enrollee-user; receive a first authentication request from a first provider server to authenticate a first inbound user, and a second authentication request from a second provider server to authenticate a second inbound user; generate a first inbound biometric-print and a second inbound biometric-print corresponding to the first inbound user and the second inbound user, by applying the one or more biometric engines on the corresponding first inbound contact data and the second inbound contact data; and transmit a first result for the first computing service to the first provider server based upon a similarity between the first inbound biometric-print and the enrolled biometric-print in the user data record, and a second result for the first second computing service to the second provider based upon the similarity between second inbound biometric-print and the enrolled biometric-print.

In some implementations, the computer is further configured to update the enrollee-record to indicate one or more computing services associated with the enrollee-user.

In some implementations, the computer is further configured to: obtain enrollment metadata associated with the user; and generate an enrolled metadata embedding for the enrollee-user by applying an identification engine of the machine-learning architecture on a plurality of types of features extracted from the enrollment metadata.

In some implementations, the computer is further configured to: generate a first inbound metadata embedding for the corresponding to the first inbound user by applying the identification engine of the machine-learning architecture on the plurality of types of the enrollment data; and identify in the database a set of one or more enrollee-records having corresponding enrolled metadata embeddings having a context similarity score to the first inbound metadata embedding within a context similarity threshold.

In some implementations, the computer selects from the database a set of one or more potential enrollee-records based upon a corresponding context similarity score satisfying a context similarity threshold, the set of one or more potential enrollee-records including the enrollee-record.

In some implementations, the computer is further configured to: apply a risk score engine of the machine-learning architecture on the inbound contact data of the first authentication request to generate a risk score; and adjust at least one of the context similarity threshold or a biometric-print similarity threshold.

In some implementations, the computer is further configured to generate a first result indication for the first provider server based upon the first similarity score. The first similarity score indicates a likelihood that the first inbound audio signal originated from the enrollee.

In some implementations, the computer is further configured to determine a first similarity score based upon a distance between the first inbound biometric-print and the enrolled biometric-print in the user account for the enrollee.

In some implementations, the computer is further configured to: obtain enrollment data of the enrollee for the user account, the enrollment data including one or more enrollment audio signals containing one or more utterances of the enrollee-user; extract a plurality of enrollment features from the one or more enrollment audio signals for the enrollee-user; and generate an enrollment voiceprint of the one or more enrollment biometric-prints by applying the machine-learning architecture on the plurality of enrollment features.

In some implementations, the computer is further configured to authenticate the first inbound user as the enrolled-user associated with the identified enrolled biometric-print, based upon the similarity between the first inbound biometric-print and the enrolled biometric-print in the user data record.

In some embodiments, a computer-implemented method comprises generating, by the computer, for an enrollee-user, one or more enrollee biometric-prints by applying one or more corresponding biometric recognition engines of a machine-learning architecture on enrollment biometric data, and one or more enrollee context-prints by applying one or more metadata recognition engines of the machine-learning architecture on the enrollment metadata; storing, by the computer, into an enrollee-record in a database, the one or more enrollee biometric-prints and the one or more enrollee context-prints; extracting, by the computer, an inbound context-print by applying the one or more metadata recognition engines on inbound metadata associated with an inbound user, and an inbound biometric-print by applying the one or more biometric recognition engines on inbound biometric data associated with the inbound user; selecting, by the computer, a set of enrollee-records containing at least one enrollee context-print satisfying a threshold amount of distance from the inbound context embedding; and identifying, by the computer, the enrolled biometric-print from the set of enrolled-user records satisfying a threshold distance of similarity with the inbound biometric-print.

In some implementations, the method further comprises generating, by the computer, a risk score associated with the inbound user by applying a risk engine of the machine-learning architecture on the inbound metadata.

In some implementations, the method further comprises authenticating, by the computer, the inbound user as the enrolled-user associated with the identified enrolled biometric-print, based upon the risk score satisfying a risk threshold.

In some implementations, the method further comprises generating, by the computer, an authentication result for the inbound user, the authentication result indicating the risk score and an identity of the enrolled-user associated with the identified enrolled biometric-print.

In some implementations, the one or more enrollee biometric-prints include an enrollee voiceprint generated by the computer applying a speaker recognition engine on one or more enrollee audio signals. The one or more inbound biometric-prints include an inbound voiceprint generated by the computer applying the speaker recognition engine on one or more inbound audio signals.

In some implementations, the one or more enrollee biometric-prints include an enrollee faceprint generated by the computer applying a facial recognition engine on one or more images. The one or more inbound biometric-prints include an inbound faceprint generated by the computer applying the facial recognition engine on one or more inbound facial signals.

In some implementations, the method further comprises receiving, by the computer, an authentication request associated with the inbound user from a computing service. The authentication request includes inbound contact data comprising the inbound metadata and the inbound biometric data.

In some implementations, the method further comprises receiving, by the computer, at least a portion of the enrollee metadata or the enrollee biometric data from the computing service.

In some implementations, generating an enrollment context-print includes: extracting, by the computer, a plurality of enrollment features from the enrollment metadata, the plurality of enrollment features having a plurality of feature-types; and applying, by the computer, the one or more metadata recognition engines on the plurality of enrollment features to extract the enrollment context-print representative of the plurality of enrollment features having the plurality of feature-types.

In some implementations, generating the inbound context-print includes: extracting, by the computer, a plurality of inbound features from the inbound metadata, the plurality of inbound features having one or more feature-types; and applying, by the computer, the one or more metadata recognition engines on the plurality of inbound features to extract the inbound context-print representative of the plurality of features having the one or more of feature-types.

In some embodiments, a system comprises a database and a computer. The database comprises non-transitory machine-readable storage configured to store a plurality of enrollee-records for a plurality of enrollee-users. The computer is in communication with the database and comprises a processor. The computer and processor configured to: generate for an enrollee-user, one or more enrollee biometric-prints by applying one or more corresponding biometric recognition engines of a machine-learning architecture on enrollment biometric data, and one or more enrollee context-prints by applying one or more metadata recognition engines of the machine-learning architecture on the enrollment metadata; store into an enrollee-record in the database, the one or more enrollee biometric-prints and the one or more enrollee context-prints; extract an inbound context-print by applying the one or more metadata recognition engines on inbound metadata associated with an inbound user, and an inbound biometric-print by applying the one or more biometric recognition engines on inbound biometric data associated with the inbound user; select a set of enrollee-records containing at least one enrollee context-print satisfying a threshold amount of distance from the inbound context embedding; and identify the enrolled biometric-print from the set of enrolled-user records satisfying a threshold distance of similarity with the inbound biometric-print.

In some implementations, the computer is further configured to generate a risk score associated with the inbound user by applying a risk engine of the machine-learning architecture on the inbound metadata.

In some implementations, the computer is further configured to authenticate the inbound user as the enrolled-user associated with the identified enrolled biometric-print, based upon the risk score satisfying a risk threshold.

In some implementations, the computer is further configured to generate an authentication result for the inbound user, the authentication result indicating the risk score and an identity of the enrolled-user associated with the identified enrolled biometric-print.

In some implementations, the one or more enrollee biometric-prints include an enrollee voiceprint generated by the computer applying a speaker recognition engine on one or more enrollee audio signals. the one or more inbound biometric-prints include an inbound voiceprint generated by the computer applying the speaker recognition engine on one or more inbound audio signals.

In some implementations, the one or more enrollee biometric-prints include an enrollee faceprint generated by the computer applying a facial recognition engine on one or more images. The one or more inbound biometric-prints includes an inbound faceprint generated by the computer applying the facial recognition engine on one or more inbound facial signals.

In some implementations, the computer is further configured to receive an authentication request associated with the inbound user from a computing service. The authentication includes inbound contact data comprising the inbound metadata and the inbound biometric data.

In some implementations, the computer is further configured to receive at least a portion of the enrollee metadata or the enrollee biometric data from the computing service.

In some implementations, when generating the enrollment context-print, the computer is further configured to: extract a plurality of enrollment features from the enrollment metadata, the plurality of enrollment features having a plurality of feature-types; and apply the one or more metadata recognition engines on the plurality of enrollment features to extract the enrollment context-print representative of the plurality of enrollment features having the plurality of feature-types.

In some implementations, when generating the inbound context-print, the computer is further configured to: extract a plurality of inbound features from the inbound metadata, the plurality of inbound features having one or more feature-types; and apply the one or more metadata recognition engines on the plurality of inbound features to extract the inbound context-print representative of the plurality of features having the one or more feature-types.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
generating, by a computer, for an enrollee-user, one or more enrollee biometric-prints by applying one or more corresponding biometric recognition engines of a machine-learning architecture on enrollee biometric data, and one or more enrollee context-prints by applying one or more metadata recognition engines of the machine-learning architecture on enrollment metadata, an enrollee context-print representative of a plurality of enrollment features having a plurality of feature-types extracted from the enrollment metadata;
storing, by the computer, into an enrollee-record in a database, the one or more enrollee biometric-prints and the one or more enrollee context-prints;
extracting, by the computer, an inbound context-print by applying the one or more metadata recognition engines on inbound metadata associated with an inbound user, and an inbound biometric-print by applying the one or more biometric recognition engines on inbound biometric data associated with the inbound user;
selecting, by the computer, a set of enrollee-records from a plurality of enrollee-records stored in the database, the set of enrollee-records containing at least one enrollee context-print satisfying a threshold amount of distance from the inbound context-print; and
identifying, by the computer, an enrollee biometric-print from the set of enrollee-records satisfying a threshold distance of similarity with the inbound biometric-print.

2. The method according to claim 1, further comprising generating, by the computer, a risk score associated with the inbound user by applying a risk engine of the machine-learning architecture on the inbound metadata.

3. The method according to claim 2, further comprising authenticating, by the computer, the inbound user as the enrollee-user associated with the identified enrollee biometric-print, based upon the risk score satisfying a risk threshold.

4. The method according to claim 2, further comprising generating, by the computer, an authentication result for the inbound user, the authentication result indicating the risk score and an identity of the enrollee-user associated with the identified enrollee biometric-print.

5. The method according to claim 1, wherein the one or more enrollee biometric-prints includes an enrollee voice-print generated by the computer applying a speaker recognition engine on one or more enrollee audio signals, and wherein the one or more inbound biometric-prints includes an inbound voiceprint generated by the computer applying the speaker recognition engine on one or more inbound audio signals.

6. The method according to claim 1, wherein the one or more enrollee biometric-prints includes an enrollee faceprint generated by the computer applying a facial recognition engine on one or more images, and wherein the one or more inbound biometric-prints includes an inbound faceprint generated by the computer applying the facial recognition engine on one or more inbound facial signals.

7. The method according to claim 1, further comprising receiving, by the computer, an authentication request associated with the inbound user from a computing service, the authentication including inbound contact data comprising the inbound metadata and the inbound biometric data.

8. The method according to claim 7, further comprising receiving, by the computer, at least a portion of the enrollment metadata or the enrollee biometric data from the computing service.

9. The method according to claim 1, wherein generating the enrollee context-print includes:
  extracting, by the computer, the plurality of enrollment features from the enrollment metadata, the plurality of enrollment features having the plurality of feature-types; and
  applying, by the computer, the one or more metadata recognition engines on the plurality of enrollment features to extract the enrollee context-print representative of the plurality of enrollment features having the plurality of feature-types.

10. The method according to claim 9, wherein generating the inbound context-print includes:
  extracting, by the computer, a plurality of inbound features from the inbound metadata, the plurality of inbound features having one or more feature-types; and
  applying, by the computer, the one or more metadata recognition engines on the plurality of inbound features to extract the inbound context-print representative of the plurality of inbound features having the one or more of feature-types.

11. A system comprising:
  a database comprising non-transitory machine-readable storage configured to store a plurality of enrollee-records for a plurality of enrollee-users; and
  a computer in communication with the database and comprising a processor configured to:
    generate for an enrollee-user, one or more enrollee biometric-prints by applying one or more corresponding biometric recognition engines of a machine-learning architecture on enrollee biometric data, and one or more enrollee context-prints by applying one or more metadata recognition engines of the machine-learning architecture on enrollment metadata, an enrollee context-print representative of a plurality of enrollment features having a plurality of feature-types extracted from the enrollment metadata;
    store into an enrollee-record in the database, the one or more enrollee biometric-prints and the one or more enrollee context-prints;
    extract an inbound context-print by applying the one or more metadata recognition engines on inbound metadata associated with an inbound user, and an inbound biometric-print by applying the one or more biometric recognition engines on inbound biometric data associated with the inbound user;
    select a set of enrollee-records from the plurality of enrollee-records stored in the database, the set of enrollee-records containing at least one enrollee context-print satisfying a threshold amount of distance from the inbound context-print; and
    identify an enrollee biometric-print from the set of enrollee-records satisfying a threshold distance of similarity with the inbound biometric-print.

12. The system according to claim 11, wherein the computer is further configured to generate a risk score associated with the inbound user by applying a risk engine of the machine-learning architecture on the inbound metadata.

13. The system according to claim 12, wherein the computer is further configured to authenticate the inbound user as the enrollee-user associated with the identified enrolled enrollee biometric-print, based upon the risk score satisfying a risk threshold.

14. The system according to claim 12, wherein the computer is further configured to generate an authentication result for the inbound user, the authentication result indicating the risk score and an identity of the enrollee-user associated with the identified enrolled enrollee biometric-print.

15. The system according to claim 11, wherein the one or more enrollee biometric-prints includes an enrollee voiceprint generated by the computer applying a speaker recognition engine on one or more enrollee audio signals, and wherein the one or more inbound biometric-prints includes an inbound voiceprint generated by the computer applying the speaker recognition engine on one or more inbound audio signals.

16. The system according to claim 11, wherein the one or more enrollee biometric-prints includes an enrollee faceprint generated by the computer applying a facial recognition engine on one or more images, and wherein the one or more inbound biometric-prints includes an inbound faceprint generated by the computer applying the facial recognition engine on one or more inbound facial signals.

17. The system according to claim 11, wherein the computer is further configured to receive an authentication request associated with the inbound user from a computing service, the authentication including inbound contact data comprising the inbound metadata and the inbound biometric data.

18. The system according to claim 17, wherein the computer is further configured to receive at least a portion of the enrollment metadata or the enrollee biometric data from the computing service.

19. The system according to claim 11, wherein when generating the enrollee context-print, the computer is further configured to:
  extract the plurality of enrollment features from the enrollment metadata, the plurality of enrollment features having the plurality of feature-types; and
  apply the one or more metadata recognition engines on the plurality of enrollment features to extract the enrollee context-print representative of the plurality of enrollment features having the plurality of feature-types.

20. The system according to claim 19, wherein when generating the inbound context-print, the computer is further configured to:
  extract a plurality of inbound features from the inbound metadata, the plurality of inbound features having one or more feature-types; and apply the one or more metadata recognition engines on the plurality of inbound features to extract the inbound context-print representative of the plurality of inbound features having the one or more of feature-types.

\* \* \* \* \*